United States Patent [19]

Nosaki et al.

[11] Patent Number: 5,099,341

[45] Date of Patent: Mar. 24, 1992

[54] IMAGE READING APPARATUS WITH IMPROVED SHADING CORRECTION

[75] Inventors: Takefumi Nosaki, Yokohama; Masako Watari, Kawasaki, both of Japan

[73] Assignee: Kabushiki Kaisha Toshiba, Kawasaki, Japan

[21] Appl. No.: 545,832

[22] Filed: Jun. 28, 1990

[30] Foreign Application Priority Data

Jun. 30, 1989 [JP] Japan .................. 1-169567

[51] Int. Cl.⁵ ............................................ H01J 40/14
[52] U.S. Cl. .................................................. 358/461
[58] Field of Search ............... 358/461, 455–456, 358/168, 174, 228, 213.19

[56] References Cited

U.S. PATENT DOCUMENTS

| 4,806,780 | 2/1989 | Yamamoto et al. | 358/461 |
| 4,903,144 | 2/1990 | Stefanik et al. | 358/461 |
| 4,984,285 | 1/1991 | Kano et al. | 358/461 |

Primary Examiner—Stephen Brinich
Attorney, Agent, or Firm—Foley & Lardner

[57] ABSTRACT

An image reading apparatus including a reading unit for reading image information upon movement and scanning, and an image forming unit for forming an image according to the image information from the reading unit, performs shading correction by utilizing a first white reference plate arranged along a direction perpendicular to the moving direction of the reading unit, and a second white reference plate arranged along the moving direction of the reading unit.

14 Claims, 18 Drawing Sheets

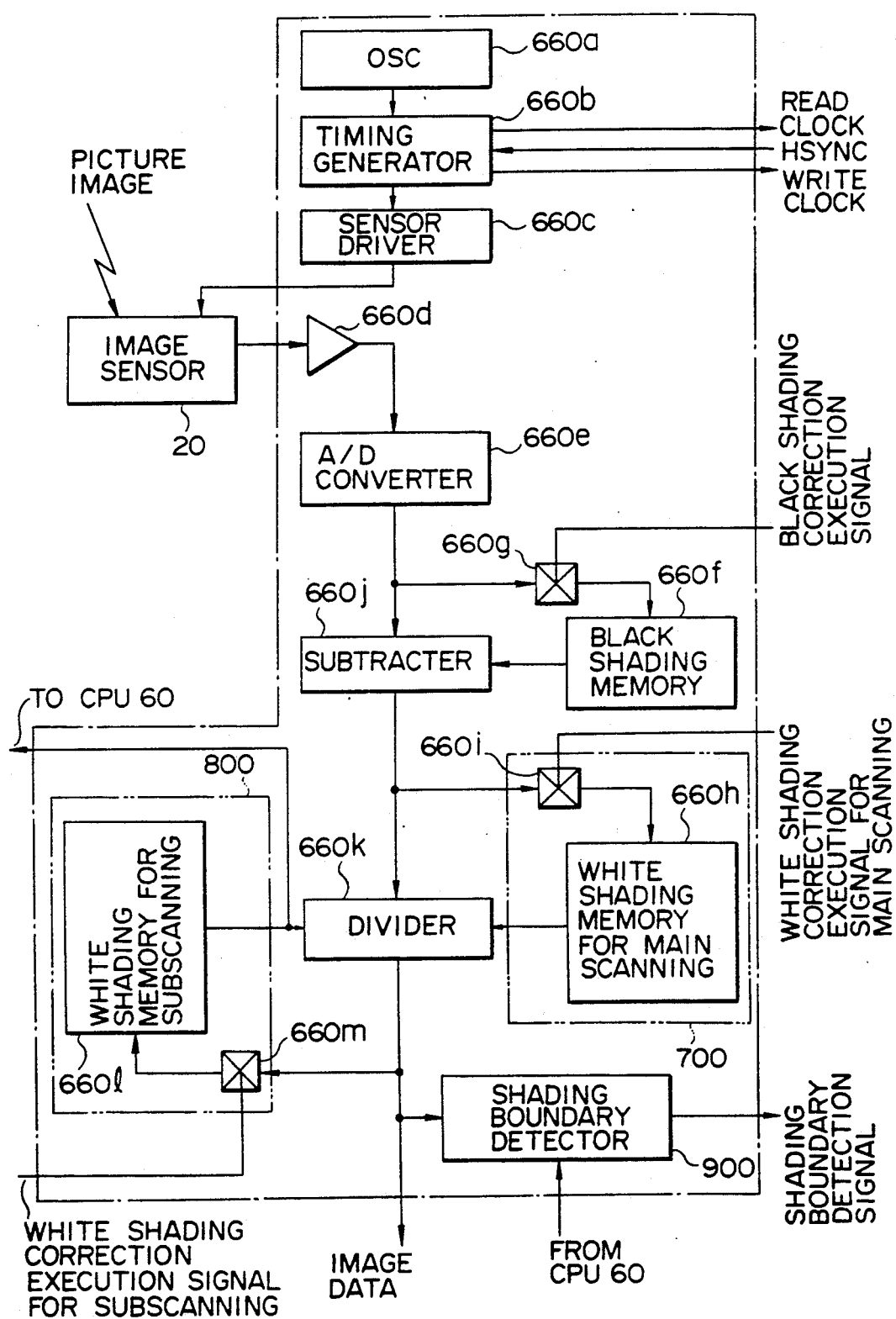
F I G. 8

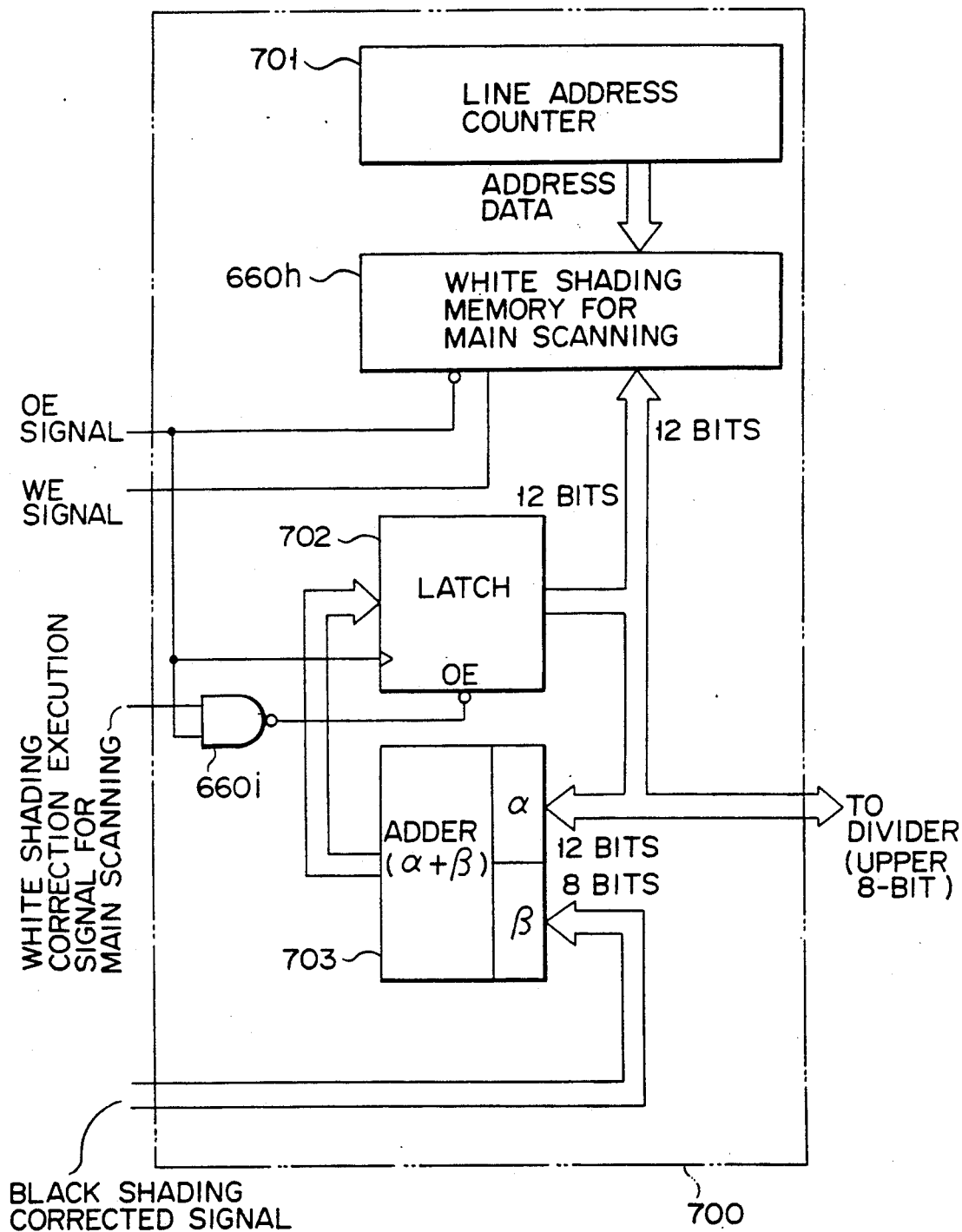
F I G. 9

F I G. 12A
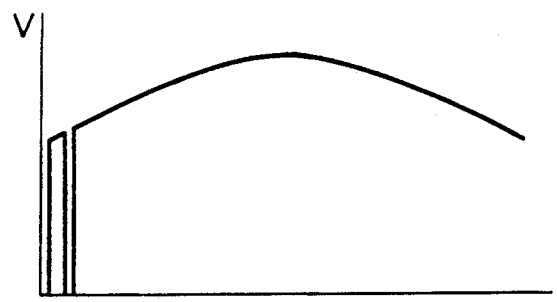
F I G. 12B
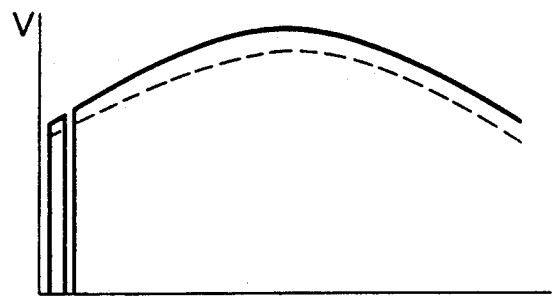
F I G. 12C
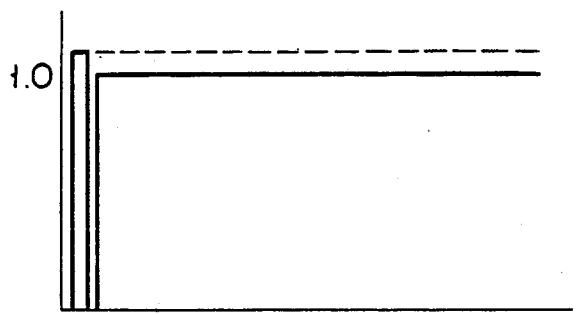
F I G. 13A
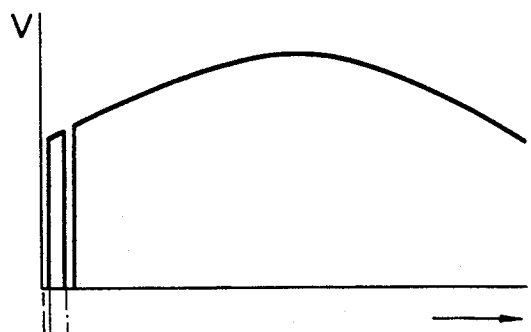
F I G. 13B  HSYNC
F I G. 13C  VSADE
F I G. 13D  VDEN (A3)
F I G. 13E  VDEN (A4)

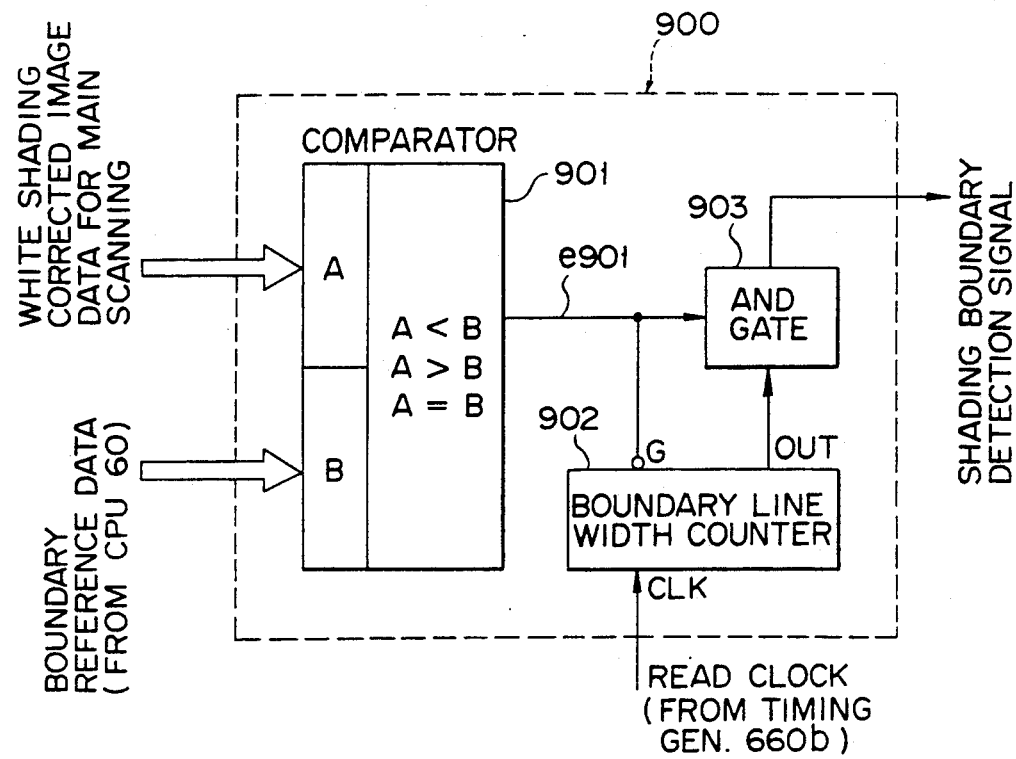
FIG. 14
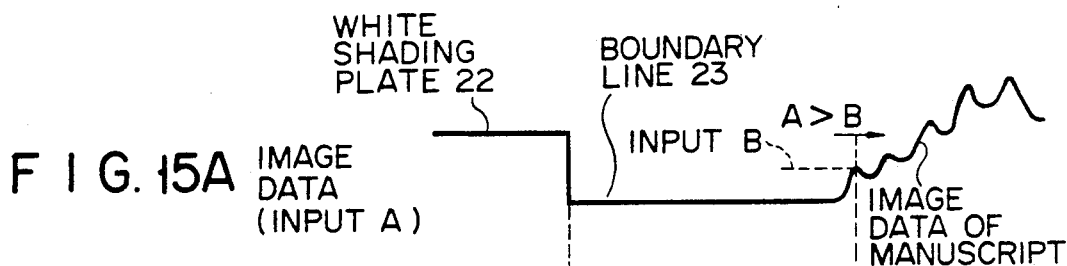
FIG. 15A IMAGE DATA (INPUT A)
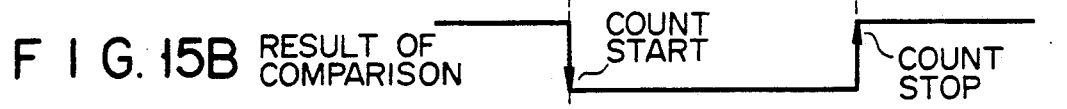
FIG. 15B RESULT OF COMPARISON
FIG. 15C BOUNDARY DET. SIGNAL
FIG. 15D INTERNAL BOUNDARY DET. SIGNAL
FIG. 15E IMAGE EFFECTIVE RANGE SIGNAL (VDEN(A3))

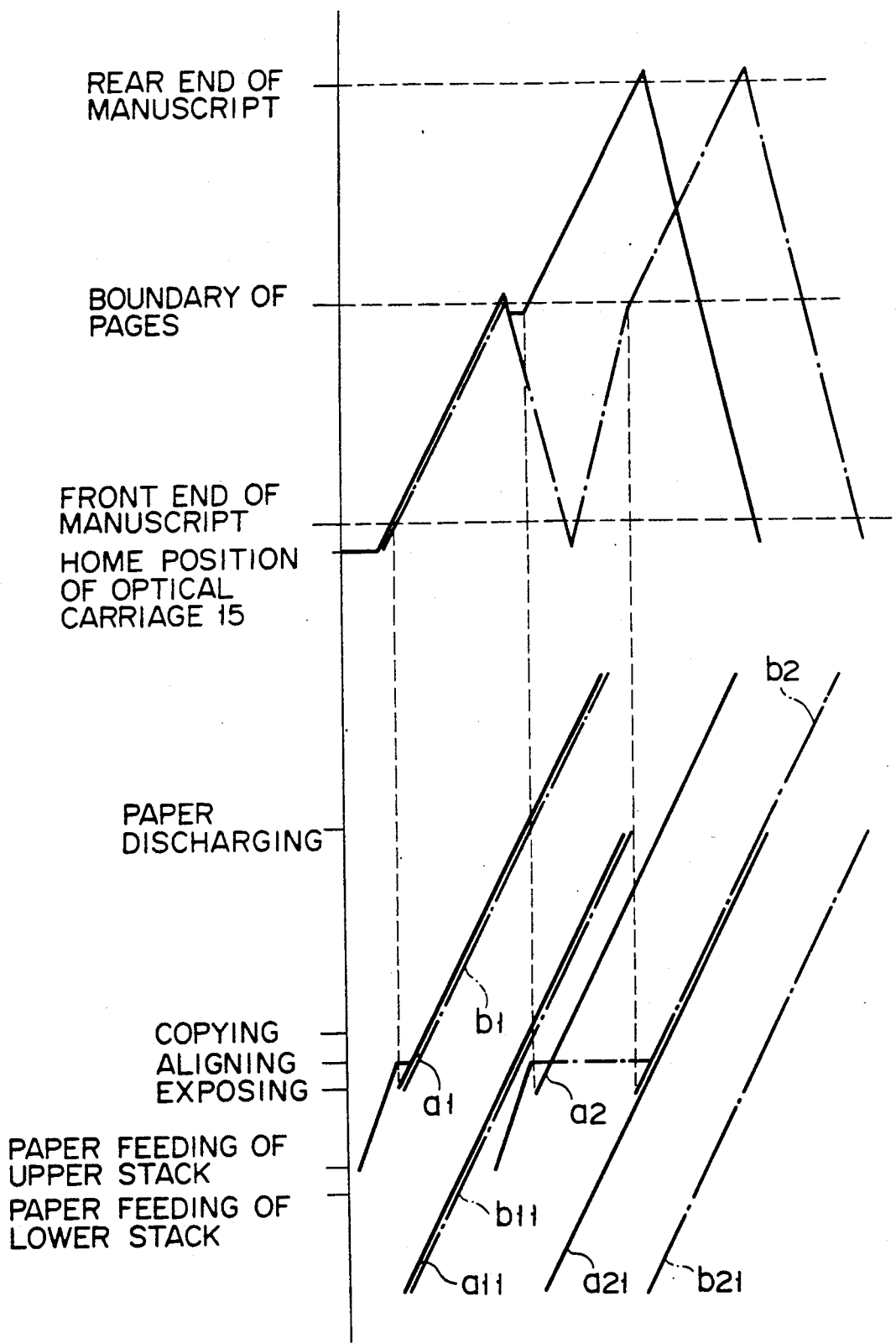
F I G. 16

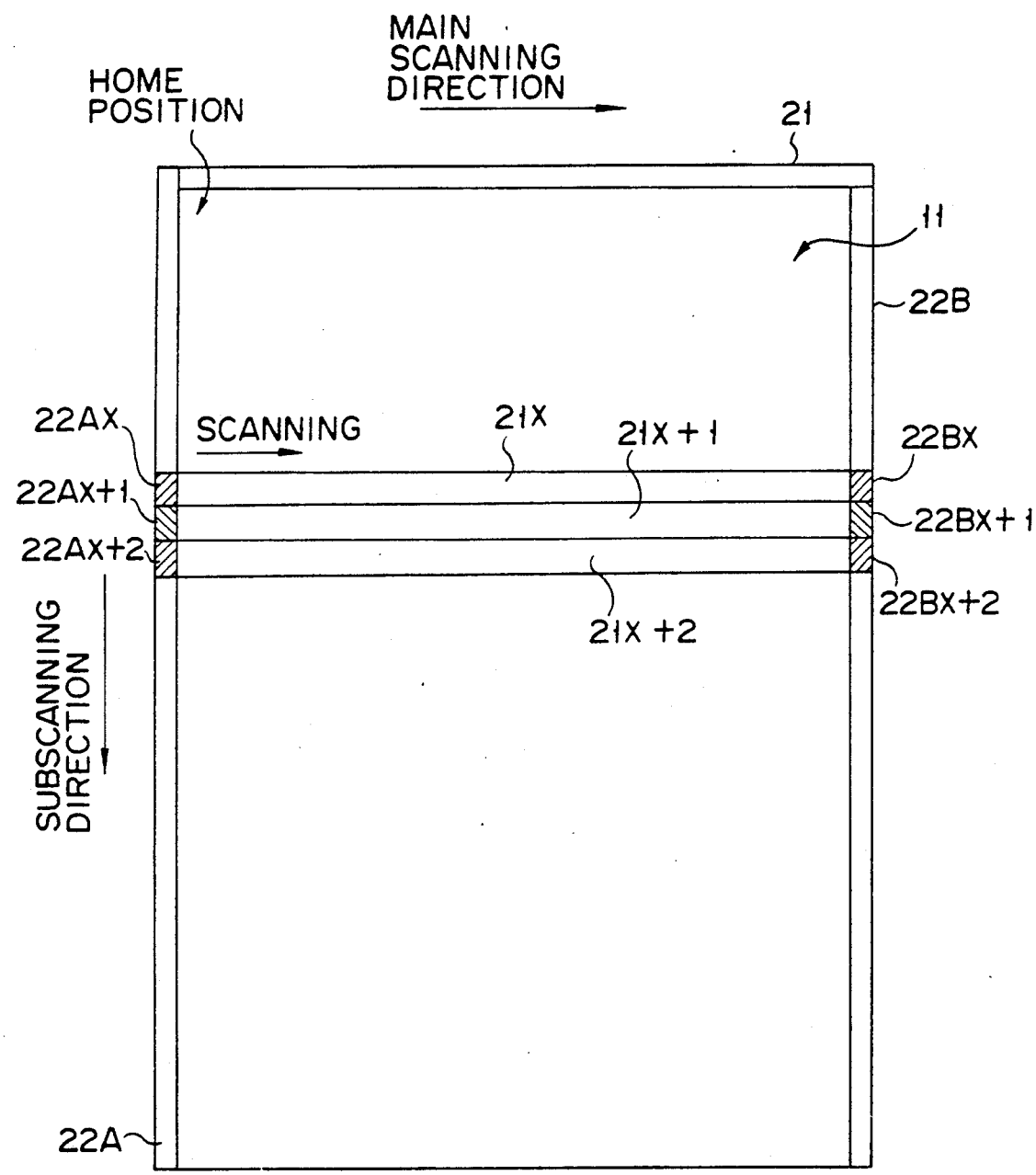
F I G. 20

IMAGE READING APPARATUS WITH IMPROVED SHADING CORRECTION

BACKGROUND OF THE INVENTION

1. Field of the Invention

The present invention relates to an image reading apparatus with shading correction, which is utilized in a digital copying machine obtained by connecting, e.g., a laser printer and an image scanner.

2. Description of the Related Art

In recent years, a digital copying machine (image reading apparatus) obtained by connecting a laser printer (image forming unit) for forming an image by an electrophotography system, and an image scanner (reading unit) for reading image information of an original or manuscript as image data upon scanning of an optical carriage (scanning means) has been put into practical applications.

As an original illumination device disposed on an optical carriage of an image scanner in a copying machine of this type, a fluorescent lamp is widely used since it has the advantages of low power consumption, a relatively uniform spectrum distribution over a wide wavelength range, a small temperature rise, and the like.

However, a fluorescent lamp has the following adverse characteristics. That is, the light amount is changed due to a variation in temperature, or the light amount distribution in the longitudinal direction of the lamp is changed. For this reason, when a fluorescent lamp is used as an original illumination device, the temperature of the fluorescent lamp is controlled to be constant by arranging a heater around the fluorescent lamp except for a portion opposing an original as a light exit, or main scan shading correction data is rewritten prior to read scanning of an original. Thus, the change in light amount or in light amount distribution is canceled, and the accuracy (reliability) of image data with respect to an original image during one scanning period is assured.

A conventional digital copying machine which employs a fluorescent lamp as an original illumination device must employ a heater for heating the fluorescent lamp, and a temperature control circuit, resulting in an increase in cost. Before the temperature of the fluorescent lamp is stabilized, read scanning of an original cannot be performed, and main scan shading correction data must be rewritten for every read scanning.

In particular, a laser printer (page printer) itself can perform image formation at high speed (high-speed printing operation) if image data are sequentially input. However, the image scanner suffers from an operation which does not contribute to the above-mentioned image formation (rewriting of main scan shading correction data). This is one of the factors which prevent a further increase in image formation speed of a digital copying machine.

SUMMARY OF THE INVENTION

It is an object of the present invention to provide an image reading apparatus which can assure reliability of image data during one scanning period, and can achieve a high-speed image forming operation.

In order to achieve the above object, an image reading apparatus according to the present invention which includes a reading unit for reading image information upon movement of the scanning means, and an image forming unit for forming an image in accordance with the image information from the reading unit, comprises a first reference plate disposed along a direction perpendicular to a moving direction of the scanning means of the reading unit, and a second reference plate disposed along the moving direction of the scanning means of the reading unit.

According to the present invention, a shading correction of image information during one scanning period is performed, using read outputs of the first and second reference plates. For this reason, neither a heater nor a temperature control circuit for keeping a constant temperature of a fluorescent lamp are required, and main scan shading correction data need not be rewritten for each scanning.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a schematic block diagram of an arrangement of a read data processor (660) shown in FIG. 5;

FIG. 9 is a schematic block diagram of an arrangement of peripheral circuits of a shading memory (660h) for main scanning shown in FIG. 8;

FIGS. 12A to 12C are views for explaining shading correction for subscanning;

FIGS. 13A to 13E are timing charts for explaining operation timings of shading correction for subscanning;

FIG. 14 is a block diagram showing an arrangement of a shading boundary detector (900) shown in FIG. 8;

FIGS. 15A to 15E are waveform charts for explaining an operation of the detector shown in FIG. 14;

FIG. 16 is a diagram for explaining the relationship between movement of an optical carriage and an image forming operation in, e.g., a page continuous printing operation;

FIG. 20 is a view for explaining the way of shading correction when a pair of shading correction plates (22A, 22B) for subscanning are arranged in addition to a shading correction plate (21) for main scanning.

DETAILED DESCRIPTION OF THE PREFERRED EMBODIMENTS

One embodiment of the present invention will be described hereinafter with reference to the accompanying drawings.

Figure 1:
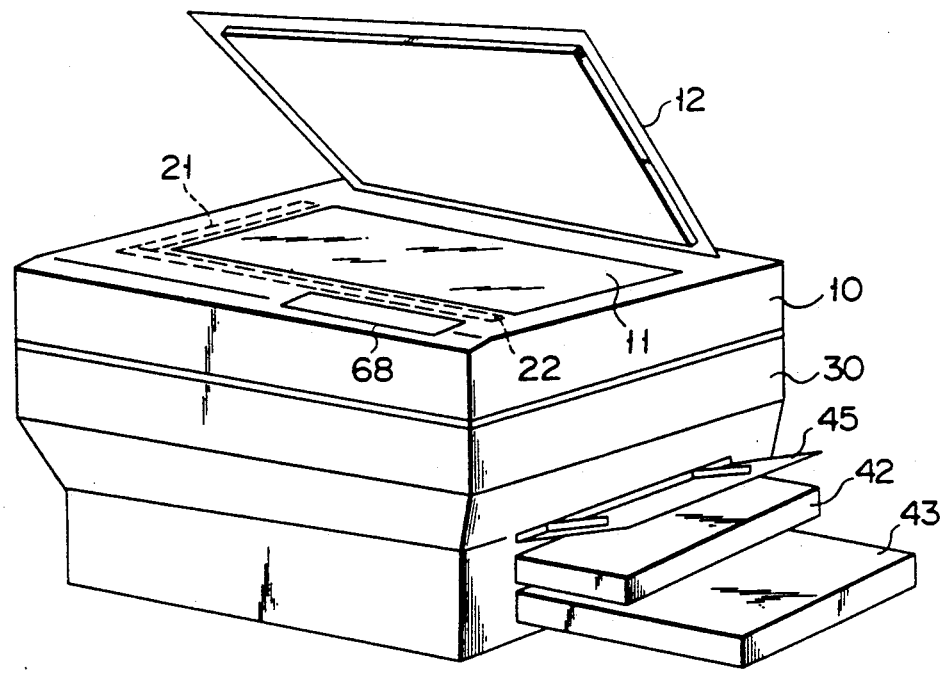
FIG. 1 is a perspective view showing an outer appearance of a digital copying machine.
Figure 2:
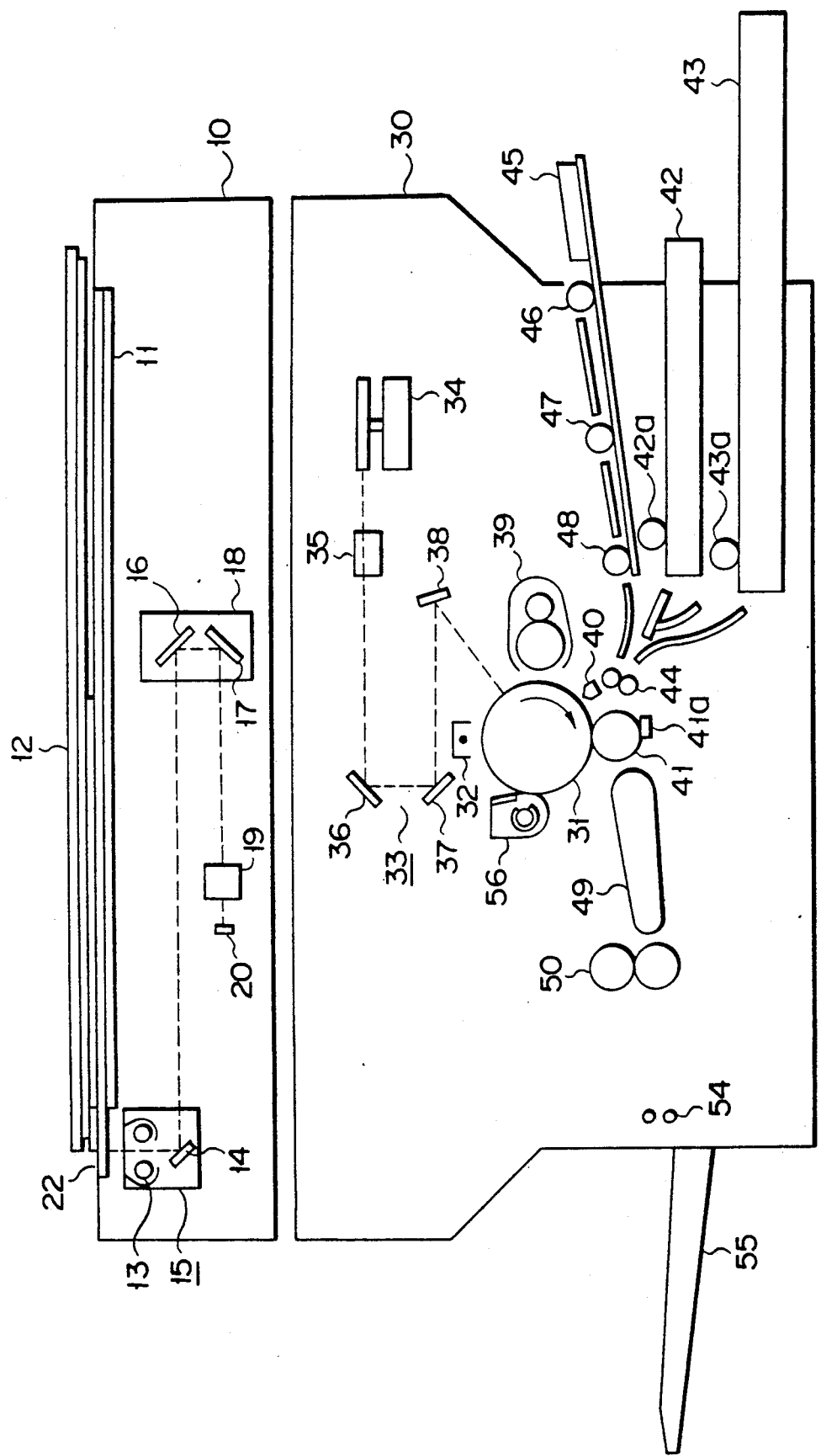
FIG. 2 is a schematic sectional view of an internal arrangement of the digital copying machine.

FIGS. 1 and 2 show a digital copying machine (digital PPC: Plane Paper Copying machine) comprising electrophotographic type laser printer (image forming unit) 30, and image scanner (reading unit) 10 as an embodiment of an image reading apparatus according to the present invention. In the digital PPC, laser printer 30 and image scanner 10 are electrically connected to each other through an interface cable, and laser printer 30 forms (prints) an image according to image data (image information) supplied from image scanner 10.

Image scanner 10 comprises original table (transparent glass) 11 on which original Or is placed, original cover 12 pivotally attached to original table 11, optical carriage (scanning means) 15 arranged to oppose these components, and having illumination lamp (fluorescent lamp) 13 as an original illumination device and first mirror 14 for receiving light reflected by original Or, subcarriage 18 having second and third mirrors 16 and 17 for deflecting light from optical carriage 15 through 180°, focusing lens 19 for focusing light reflected by original Or via subcarriage 18, image sensor 20 comprising CCDs (charge-coupled devices) for photoelectrically converting light focused by focusing lens 19 to read image data, a driving system (not shown) for changing the positions of these units, and the like.

In this arrangement, when optical carriage 15 is reciprocally moved in a subscanning direction by a distance according to the size of original Or along the lower surface of original table 11, an image formed on original Or is read by image sensor 20.

Figure 3:
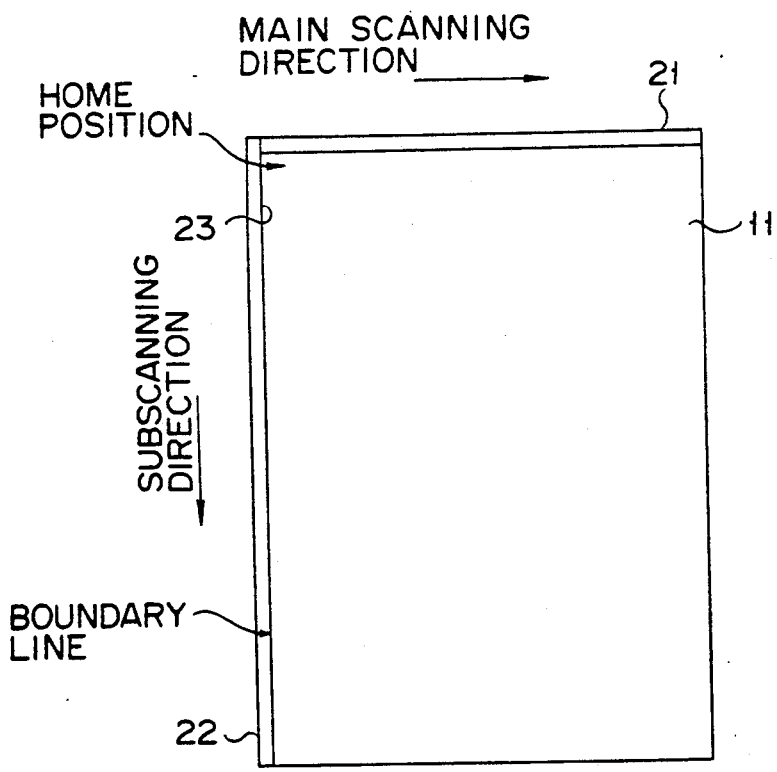
FIG. 3 is a view showing a positional relationship between a shading correction plate (21) for main scanning and a shading correction plate (22) for subscanning with respect to an original table (11)

As shown in FIG. 3, shading correction plate 21 for main scanning as a first white reference plate is arranged outside a reading range and near a portion of original table 11 opposing an initial position (home position) of optical carriage 15.

Furthermore, shading correction plate 22 for subscanning as a second white reference plate is arranged outside a reading range and near a portion of original table 11 along the subscanning direction of optical carriage 15. Boundary line 23 is drawn along shading correction plate 22 between correction plate 22 and original table 11.

Incidentally, each of the reference plates (21, 22) has a predetermined shade of darkness (e.g., white).

Manipulation panel 68 for inputting instructions of operations is arranged on a manipulation surface of the digital PPC.

Laser printer 30 is arranged as follows. In FIG. 2, reference numeral 31 denotes a photosensitive drum. Charger 32, laser optical system 33, developing unit 39, transfer precharging lamp 40, transfer roller 41, and cleaning device 56 are arranged around photosensitive drum 31 in the order named. Note that transfer roller 41 has blade 41a for removing a toner attached to roller 41.

Laser optical system 33 comprises a semiconductor laser oscillator (not shown) such as a laser diode for generating a laser beam modulated according to dot image data, a collimator lens (not shown) for collimating the laser beam output from the laser oscillator, rotary mirror (polygonal mirror) 34 for scanning light emerging from the collimator lens, lens 35 having both a function of an f-$\theta$ lens for allowing the laser beam scanned by rotary mirror 34 to pass therethrough to make constant the scanning speed on photosensitive drum 31, and the function of a correction lens for correcting a plane deviation, reflection mirrors 36, 37, and 38 for reflecting the laser beam passing through lens 35 toward photosensitive drum 31, and the like.

Paper feed cassettes 42 and 43 are detachably attached to one side surface portion of laser printer 30. Paper sheets stored in these paper feed cassettes 42 and 43 are respectively picked up by pickup rollers 42a and 43a. Aligning roller pair 44 for feeding a paper sheet picked up from one of paper feed cassettes 42 and 43 in synchronism with a toner image formed on photosensitive drum 31 are arranged at the downstream side of pickup rollers 42a and 43a. Manual feed table 45 for manually feeding a paper sheet or another recording medium is arranged above upper paper feed cassette 42. Manual feed rollers 46, 47, and 48 for feeding manually fed paper sheet or the like to the position of aligning roller pair 44 are arranged above manual feed table 45 in the order named.

Convey path 49 extending via an image transfer unit, heat roller pair 50 as a fixing device, and exhaust roller pair 54 are disposed at the downstream side of the image transfer unit between photosensitive drum 31 and transfer roller 41. Exhaust tray 55 for receiving a paper sheet or the like exhausted by exhaust roller pair 54 is arranged on the other side surface portion of laser printer 30.

With the above arrangement, when a printing operation is to be performed, photosensitive drum 31 is rotated, and charger 32 is operated to uniformly charge the surface of photosensitive drum 31. Laser optical system 33 exposes the surface of photosensitive drum 31 in correspondence with dot image data, thereby forming an electrostatic latent image. The latent image on photosensitive drum 31 is developed by developing unit 39 using a two-component developing agent consisting of a toner and a carrier, thus forming a toner image. Thereafter, the surface potential of photosensitive drum 31 is decreased by transfer precharging lamp 40, so that the toner image is easily transferred. The toner image is then conveyed to the image transfer unit.

In synchronism with the toner image forming operation, a paper sheet selectively picked up from paper feed cassettes 42 and 43, or a paper sheet or the like manually fed from manual feed table 45 is fed through aligning roller pair 44. Thus, the toner image formed on photosensitive drum 31 is transferred onto the paper sheet or the like upon operation of transfer roller 41.

The paper sheet or the like on which the toner image is transferred is fed to heat roller pair 50 via convey path 49, and passes therebetween, so that the toner image is melted and fixed onto the paper sheet. The fixed paper sheet is exhausted onto exhaust tray 55 upon operation of exhaust roller pair 54.

A residual toner on the surface of photosensitive drum 31 after the toner image is transferred onto the paper sheet or the like is cleaned by cleaning device 56 to prepare for the next printing operation.

Figure 4:
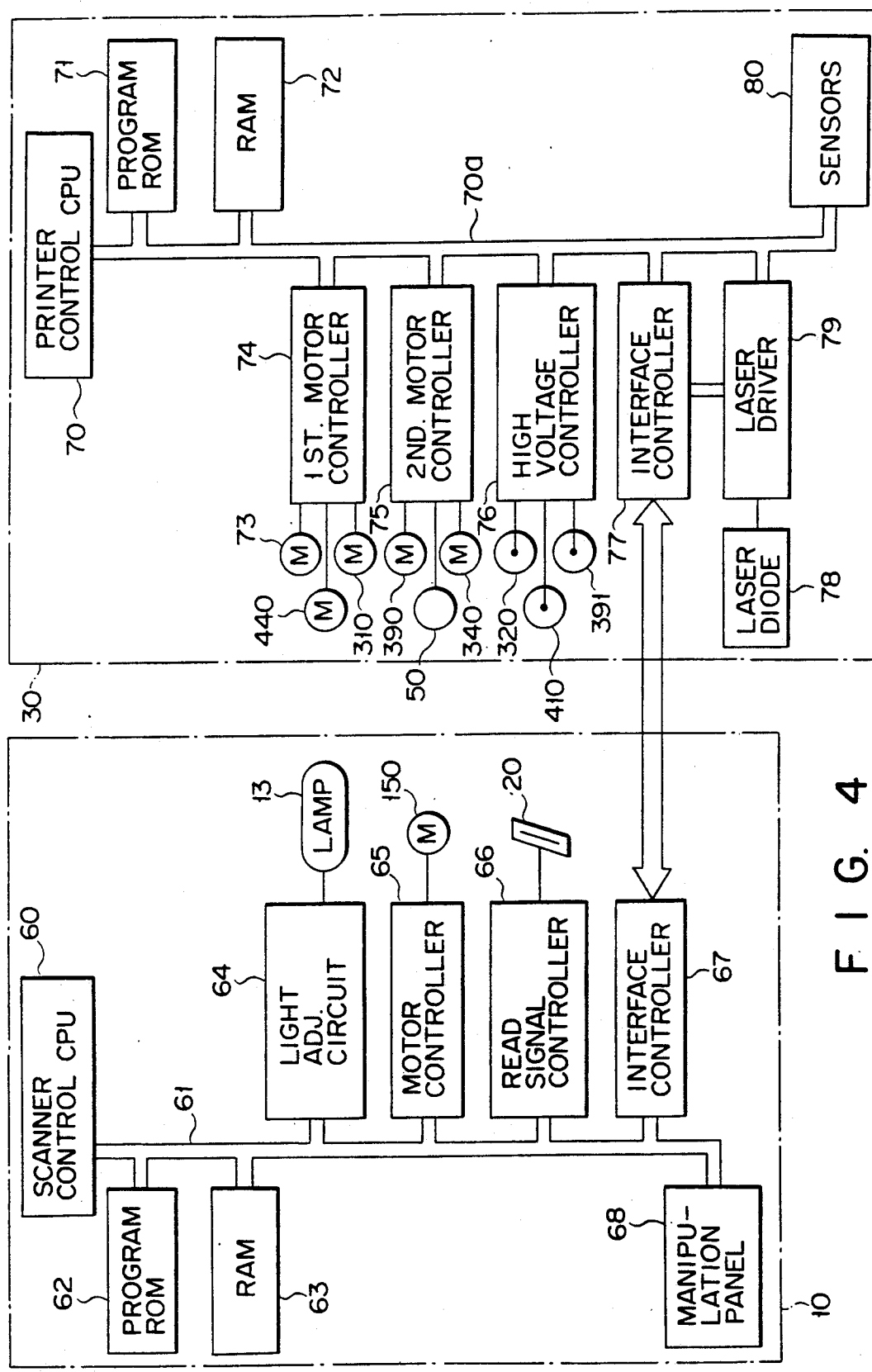
FIG. 4 is a schematic block diagram of the overall control circuit of the copying machine shown in FIG. 1.

FIG. 4 shows an electrical circuit of the digital PPC with the above arrangement.

In image scanner 10, reference numeral 60 denotes a CPU (central processing unit) for performing overall control. CPU 60 is connected through CPU bus 61 to control program ROM (read-only memory) 62, RAM (random access memory) 63 for storing a moving amount (number of steps) of optical carriage 15 according to a size of original Or, light adjusting circuit 64 for controlling an ON/OFF operation and an exposure amount of illumination lamp 13, motor controller 65 for controlling driving motor 150 for moving optical carriage 15, read signal controller 66 for controlling an operation of image sensor 20, interface controller 67 for connection with laser printer 30, manipulation panel 68, and the like.

Although not shown, CPU 60 receives signals from various sensors, and the like.

In laser printer 30, reference numeral 70 denotes a CPU for performing overall control. CPU 70 is connected through CPU bus 70a to control program ROM 71, RAM 72, first motor controller 74, second motor controller 75, high voltage controller 76, interface controller 77 for connection with image scanner 10, laser driver 79 for driving semiconductor laser diode 78, various sensors 80, and the like.

First motor controller 74 controls paper feed motor 73 for selectively driving paper feed rollers 42a and 43a, registration motor 440 for selectively driving aligning roller pair 44, manual feed rollers 46, 47, and 48, and the like, drum motor 310 for rotating photosensitive drum 31, and the like. Since normal and reverse rotations and operation stop are frequently performed, motors 73, 440, and 310 comprise, e.g., pulse motors.

Second motor controller 75 controls developing motor 390 for driving developing unit 39, heaters of heat roller pair 50, and polygonal motor 340 for rotating rotary mirror 34, and the like. Motors 390 and 340 comprise Hall IC motors which can be rotated at constant speed.

High voltage controller 76 controls high voltage power supply 320 for driving charger 32, transfer high voltage power supply 410 for driving transfer roller 41, developing bias power supply 391 of developing unit 39, and the like.

Figure 5:
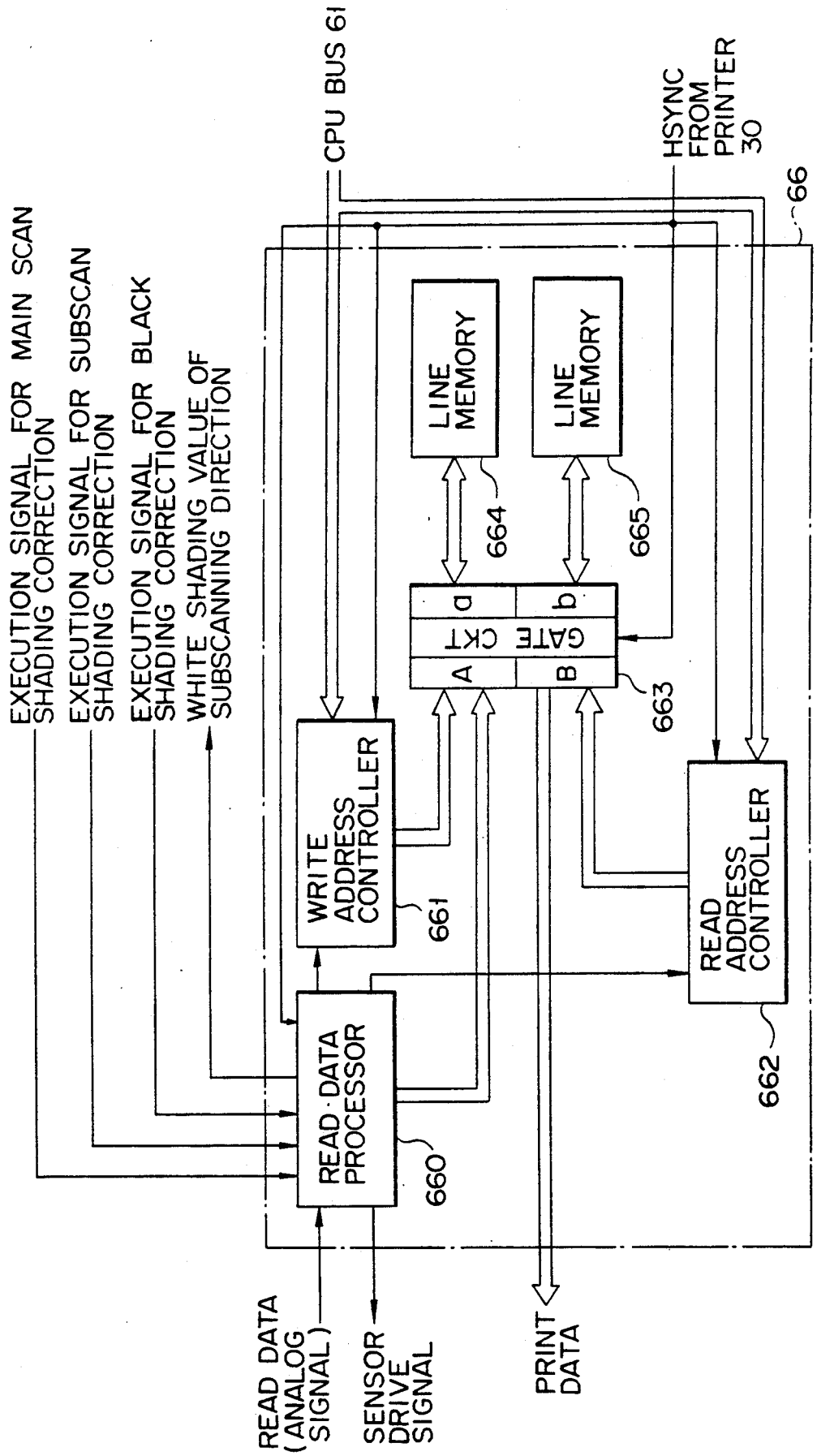
FIG. 5 is a schematic block diagram showing an arrangement of a read signal controller (66) in FIG. 4.

FIG. 5 shows an arrangement of read signal controller 66. Read signal controller 66 comprises read data processor 660, write address controller 661, read address controller 662, gate circuit 663, and two line memories 664 and 665.

In read signal controller 66 shown in FIG. 5, when an HSYNC signal (line sync signal) is supplied from laser printer 30, gate circuit 663 switches connections between gates A and B and gates a and b. When gates A and a and gates B and b of gate circuit 663 are connected to each other, image data supplied from image sensor 20 through read data processor 660 are written in line memory 664. In this case, address control of line memory 664 is performed by write address controller 661.

Figure 6:
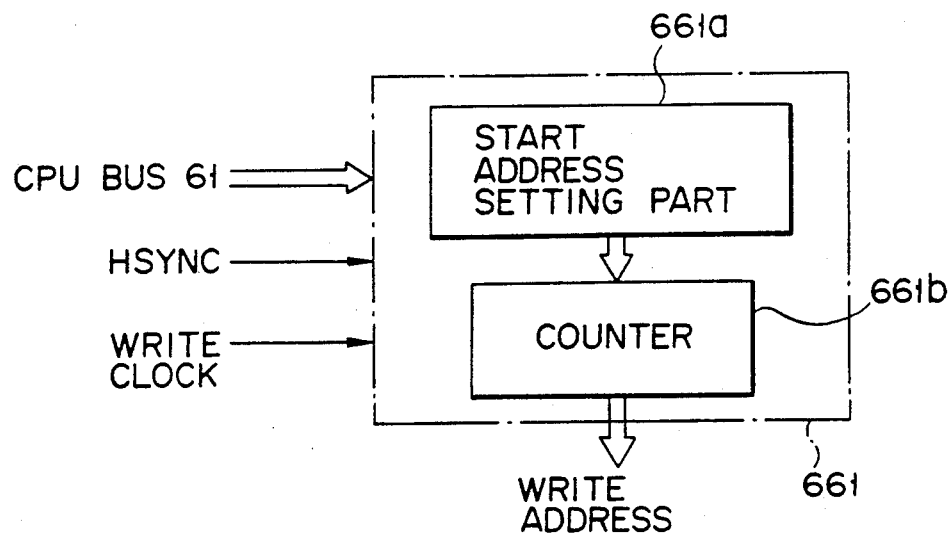
FIG. 6 is a schematic block diagram showing an arrangement of a write address controller (661) shown in FIG. 5.

Write address controller 661 is arranged as shown in FIG. 6. A start address is set in start address setting part 661a by CPU 60 of laser scanner 10 through CPU bus 61. Counter 661b is incremented by a step width of 1 from the start address. The increment operation is performed in synchronism with a write clock per pixel (write pulse) generated by a timing generator in read data processor 660, as will be described later.

Upon completion of reading of one line, the connection state of gate circuit 663 is switched in response to the line sync signal (HSYNC signal) from laser printer 30, so that gates A and a are connected to each other, and gates B and b are connected to each other. Thus, image data supplied from image sensor 20 through read data processor 660 are written in line memory 665. In this case, address control of line memory 665 is performed by write address controller 661 as in write access of line memory 664 for one preceding line.

In this case, image data in line memory 664 is read out as print data (bit image data) to laser printer 30 via gate circuit 663. Address control of line memory 664 in this case is performed by read address controller 662.

Figure 7:
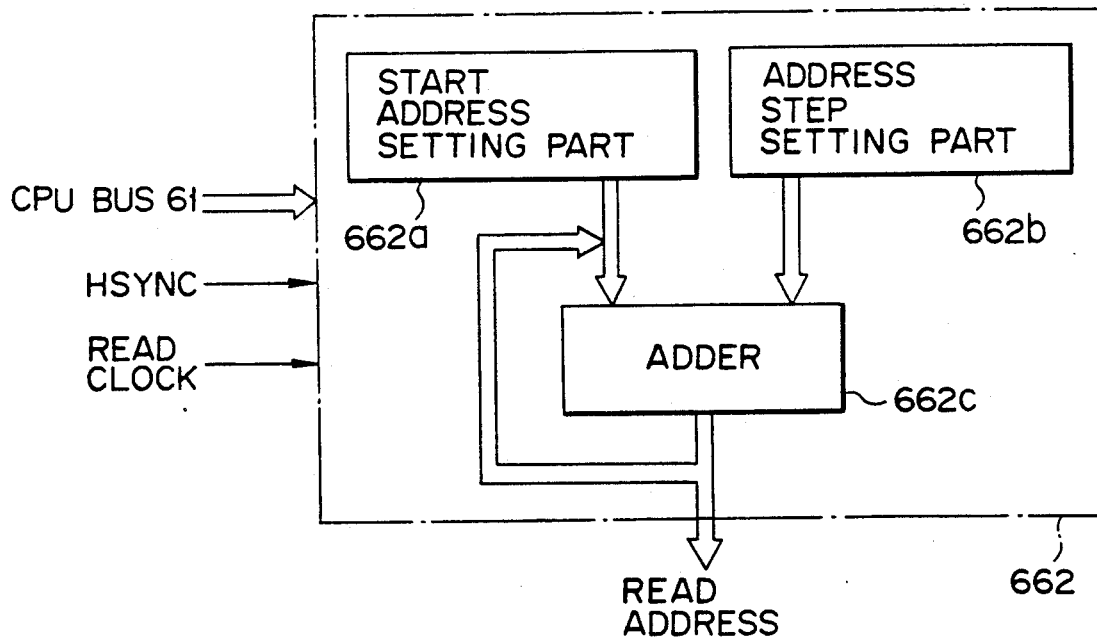
FIG. 7 is a schematic block diagram of an arrangement of a read address controller (662) shown in FIG. 5.
Figure 10:
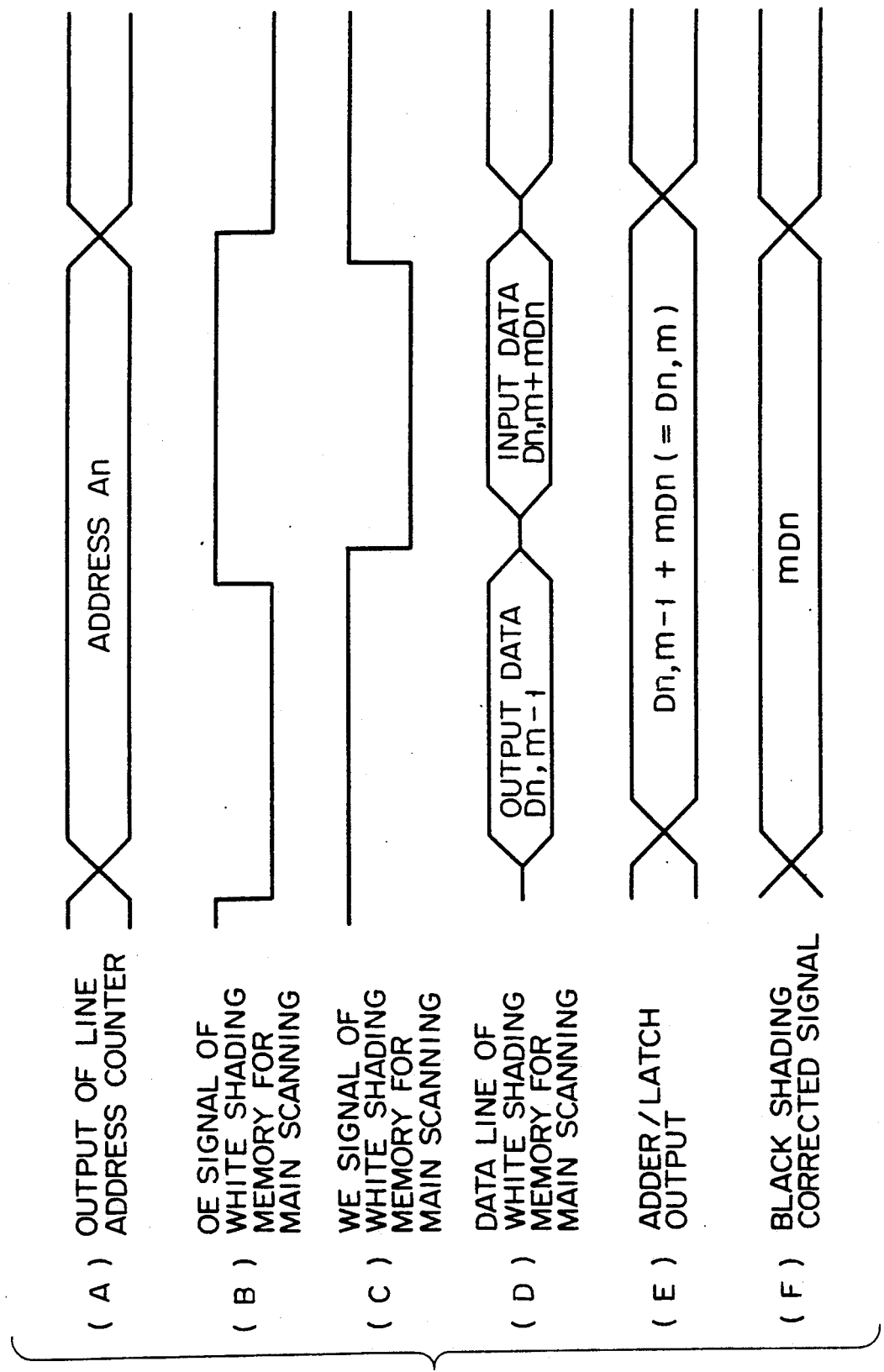
FIGS. 10A to 10F are timing charts for explaining a data rewrite operation of the shading memory for main scanning.

More specifically, in read address controller 662, as shown in FIG. 7, a start address is set in start address setting part 662a and an address step is set in address step setting part 662b by CPU 60 of image scanner 10, respectively. A read address is obtained by incrementing the start address, in adder 662c, by a step width set by setting part 662b in response to a read clock. In this case, if the start address is "0" and the step width is "1" (in this embodiment, A3 corresponds to 400 dpi (dot-per-inch)), the read address is changed in the range of 0 to 4647 by the step width of "1".

Since read address controller 662 comprises adder 662c, it has another function different from that of write address controller 661. More specifically, when an address step is, e.g., a value smaller than 1 and including a decimal part, only an integer part is output as an address to be output. However, read address controller 662 also calculates a decimal part. Therefore, while only a decimal part is changed, the same address is repetitively output, thus obtaining an enlarged copy. When an address step is a value larger than 1, a reduced copy can be obtained. Note that in the case of a reduced copy, an address output may often exceed a write range of line memories 664 and 665. Such an overflow problem of the write range can be solved by normalizing overflow data read out to line memories 664 and 665 as non-printing data.

FIG. 8 shows an arrangement of read data processor (peripheral circuits of image sensor 20) 660.

In FIG. 8, timing generator 660b generates various signals for operating image sensor 20 on the basis of pulses from oscillator 660a in synchronism with an HSYNC signal from laser printer 30. Various signals are amplified to large level signals by sensor driver (CCD driver) 660c, and are subjected to driving of image sensor 20. An analog signal from image sensor 20 driven in this manner is amplified to a voltage value of several volts by amplifier 660d, and is then converted to a digital signal by A/D converter 660e. Note that timing generator 660b also generates various signals (read and write clocks to line memories 664 and 665) for read signal controller 66.

Black shading memory 660f stores, as an offset value of image sensor 20, a signal which is read when illumination lamp 13 carried on optical carriage 15 is kept off. When a signal is to be stored in black shading memory 660f, a black shading correction execution signal from CPU 60 enables gate 660g.

Black shading correction will be described below.

An analog signal from image sensor 20 normally includes a signal component which is output when original Or is black, i.e., when no light is input to image sensor 20 at all. Therefore, this signal component (offset value) must be eliminated as an unnecessary component. The offset value in this case is called a black shading value, and this processing is called black shading correction.

Since elements of image sensor 20 have unique values, the black shading value requires data of one line. For this reason, black shading memory 660f comprises a line memory and a line address counter.

White shading memory 660h for main scanning stores a signal (white shading value for main scanning) obtained by subtracting, by subtracter 660j, the black shading value from a signal which is read when optical carriage 15 is moved to a position opposing shading correction plate 21 for main scanning while illumination lamp 13 is turned on by CPU 60. The white shading value for main scanning is data for correcting exposure nonuniformity of illumination lamp 13, sensitivity nonuniformity of image sensor 20, and the like, and is stored in memory 660h when gate 660i is enabled in response to a white shading correction execution signal for main scanning from CPU 60. In this case, an average value of data of, e.g., 16 lines is used as the white shading value for main scanning in consideration of density nonuniformity of shading correction plate 21 for main scanning, or the like.

The white shading value for main scanning is nonperiodically rewritten. More specifically, since a light amount of illumination lamp 13 changes, i.e., characteristics of the fluorescent lamp are changed due to a variation in temperature, the white shading value for main scanning is rewritten in accordance with a change in light amount. 5 White shading memory 660l for subscanning stores a signal (white shading value for subscanning) obtained by performing, by divider 660k, main scan white shading correction of a signal read from shading correction plate 22 for subscanning, which is read first in all the lines upon read scanning of original Or upon movement of optical carriage 15. The white shading value for subscanning is stored in memory 660l when gate 660m is enabled in response to a white shading correction execution signal for subscanning from CPU 60. The white shading value for subscanning is obtained by averaging data of, e.g., 16 pixels since only one pixel may cause density nonuniformity.

Divider 660k divides an output from subtracter 660j, i.e., a black shading corrected signal with the white shading value for main scanning from white shading memory 660h for main scanning, and then divides the quotient with the white shading value for subscanning from white shading memory 660l for subscanning, thus outputting the quotient as image data. In general, divider 660k comprises a PROM (programmable read-only memory) in which calculation results are preset.

When correction by the white shading value for subscanning is performed, it may be considered that the white shading value for main scanning need not be rewritten. However, it is impossible to omit rewriting, since characteristics of the fluorescent lamp are only slightly changed. When light distribution characteristics in a direction of tube length of the fluorescent lamp are changed with an increase in temperature of a tube, the light amount of the central portion of illumination lamp 13 decreases. However, since this change is not so abrupt, the white shading value for main scanning need only be rewritten when a ratio of subscan white shading correction is increased, that is, when the light amount of the fluorescent lamp is largely changed. For this reason, white shading memory 660l for subscanning supplies data indicating a ratio of subscan white shading correction to CPU 60 of image scanner 10 in addition to divider 660k.

In this manner, the white shading value of white shading memory 660h for main scanning is rewritten not for every read scanning of original Or but only when the white shading value for subscanning from white shading memory 660l for subscanning is largely changed.

Main scan shading correction means 700 mainly constituted by white shading memory 660h for main scanning will be described in detail below with reference to FIG. 9.

White shading memory 660h for main scanning comprises means for averaging data of 16 lines, as described above. More specifically, line address counter 701, latch circuit 702, and adder 703 are arranged around white shading memory 660h in addition to gate 660i.

With this arrangement, when an average value of data of 16 lines is to be calculated, only a write signal (WE signal) is supplied from CPU 60 to white shading memory 660h, while supply of the white shading correction execution signal for main scanning is stopped. The content of white shading memory 660h is all cleared. Thereafter, upon supply of the white shading correction execution signal for main scanning, data of the first line of a black shading corrected signal is supplied, as input data $\beta$, to white shading memory 660h through adder 703 and latch circuit 702. In response to the WE signal from CPU 60, input data $\beta$ latched by latch circuit 702 is written in memory 660h.

When data $\beta$ of the second line is input, a read signal (OE signal) is supplied to white shading memory 660h for main scanning, latch circuit 702, and gate 660i, so that data ($\beta$) written in memory 660h is read out to adder 703 as output data $\alpha$. Thus, adder 703 calculates a sum of readout output data $\alpha$ and input data $\beta$ of the second line. The sum ($\alpha+\beta$) is supplied to memory 660h through latch circuit 702, and is written in memory 660h as new data.

In this manner, the sum of output data of up to the immediately preceding line written in memory 660h and input data of the next line is sequentially calculated by addition. All the data of 16 lines are added, and a total sum is finally written in memory 660h.

FIGS. 10A to 20F show rewrite timings of data to memory 660h. FIGS. 10A to 10F exemplify a case wherein a rewrite operation is performed by a sum $D_{n,m-1}+mD_n$ (FIG. 10F) of addition result $D_{n,m-1}$ (FIG. 10D) up to an (m−1)th line at address An (FIG. 10A) designated by line address counter 701 (output data $\alpha$), and data $mD_n$ (FIG. 10F: input data $\beta$) of the mth line.

Of the total sum of 12-bit data written in memory 660h, upper 8 bits are used as the white shading value for main scanning More specifically, when upper 8 bits of 12-bit data are used, this is equivalent to the fact that the total sum of data is divided by "16". Therefore, the white shading value for main scanning is an average value of data of 16 lines. As a result, degradation of image quality caused by density non-uniformity and contamination of shading correction plate 21 for main scanning, e.g., generation of vertical stripes can be prevented.

Figure 11:
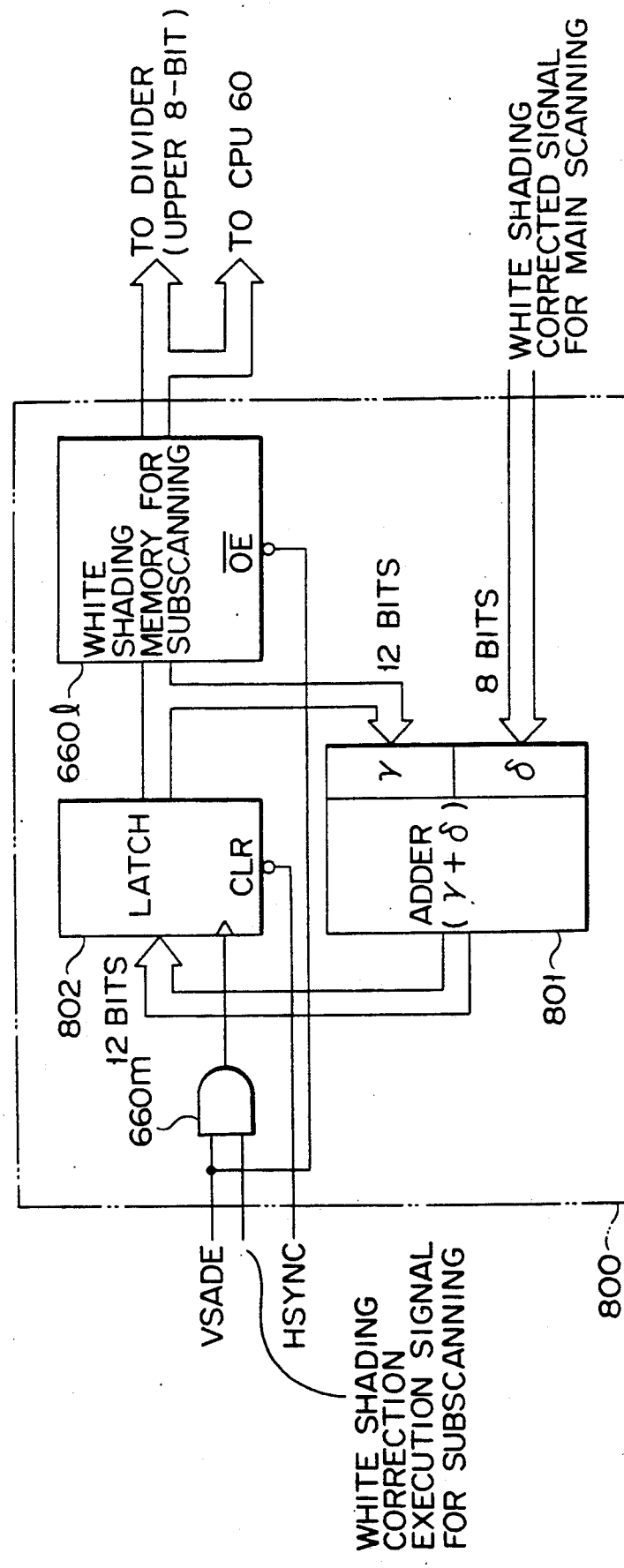
FIG. 11 is a schematic block diagram of an arrangement of peripheral circuits of a shading memory (660l) for subscanning shown in FIG. 8.

FIG. 11 shows in detail subscan shading correction means 800 mainly constituted by white shading memory 660*l* for subscanning.

White shading memory 660*l* for subscanning comprises means for averaging data of 16 pixels, as described above. Adder 801 and latch circuit 802 are arranged around white shading memory 660*l* in addition to gate 660*m*. Note that gate 660*m* operates to forcibly set an output to divider 660*k* to be "0" when the white shading value for subscanning is calculated.

In the subscanning direction, data of 16 pixels are sequentially added by adder 801 in the same manner as the white shading value for main scanning. Upper 8 bits of a total sum ($\Sigma(\gamma+\delta)$) of the obtained 12-bit data are used, so that data of 16 pixels are averaged. Thus, density nonuniformity and contamination of shading correction plate 22 for subscanning are compensated for.

The effect of correction by the white shading value for subscanning will be described below with reference to FIGS. 12A to 12C.

FIG. 12A shows an output of image sensor 20 when shading correction plate 21 for main scanning is read.

As can be apparent from FIG. 12A, even when uniform density data is read, a uniform output cannot be obtained since a decrease in light amount of peripheral portions caused by a through lens (e.g., focusing lens 19), illumination nonuniformity of illumination lamp 13, sensitivity nonuniformity of image sensor 20, and the like are present in the main scan direction.

The offset value of image sensor 20 is subtracted from the output from image sensor 20 to perform black shading correction. Thereafter, the black shading corrected signal is divided by the white shading value for main scanning obtained when uniform density data is read, thus obtaining accurate data having flat characteristics. However, such data can be obtained only when the light amount of illumination lamp 13 is stable. If the light amount of illumination lamp 13 is changed, accurate data cannot be obtained by only the abovementioned correction.

FIG. 12B shows a difference in outputs of image sensor 20 caused by a change in light amount of illumination lamp 13. In FIG. 12, an output before a light amount is increased is indicated by a broken curve, and an output when a light amount is increased is indicated by a solid curve. In practice, since the light amount is changed during read scanning of original Or, a case wherein original Or has the same density as shading correction plate 21·for main scanning is assumed herein.

FIG. 12C shows a difference of data obtained when the light amount of illumination lamp 13 is increased. Since no heater is used, only data indicated by a broken line in FIG. 12C is obtained in a normal state (when no correction by the white shading value for subscanning is performed).

However, when a white shading corrected signal for main scanning is divided by the white shading value for subscanning, i.e., the entire output is divided by an output obtained when shading correction plate 21 for subscanning is read, accurate data having flat characteristics, as those before increasing the light amount of the fluorescent lamp, can be obtained, as indicated by a solid line.

FIGS. 13A to 13E show timings when subscan shading correction (FIG. 13A) is performed. An HSYNC signal (FIG. 13B) is a line sync signal from laser printer 30. A VSADE signal (FIG. 13C) is a signal indicating a read timing of the white shading value for subscanning in one line. A VDEN signal is a signal indicating an effective range of image data in accordance with the size (FIG. 13D for A3; FIG. 13E for A4) of original Or.

In this case, the VSADE signal is synchronized with the read output of shading correction plate 22 for subscanning, thereby easily adjusting subscan shading correction. More specifically, the VSADE signal is synchronized with a portion from the beginning of an output to boundary line 23 between the read outputs of shading correction plates 22 and 21, so that the signal (VSADE) for performing subscan shading correction can be easily synchronized at the home position of optical carriage 15.

FIG. 14 shows an internal arrangement of shading boundary detector 900. FIGS. 15a to 15C are waveform charts for explaining operations of the detector shown in FIG. 14.

In FIG. 14, the A input of comparator 901 receives white shading corrected image data for main scanning (FIG. 15A), and the B input receives boundary reference data for identifying boundary line 23 shown in FIG. 3, which is supplied from CPU 60. The boundary reference data (comparison level) can be desirably set by CPU 60.

Comparator 901 supplies active-low comparison result signal e901 to boundary line width counter 902 when the A input level is less than the B input level (this corresponds to the position of boundary line 23). Upon reception of signal e901, counter 902 starts counting of read clocks from timing generator 660*b* (FIG. 15B).

When scanning is shifted to original table 11, the output level of image sensor 20 is increased (the upper side of FIG. 15A indicates high level of white). When the output level of the image sensor (A input) exceeds the boundary reference data level (B input) (A>B), comparator 901 supplies high-level comparison result signal e901 to boundary line width counter 902 and AND gate 903. Counter 902 then ends counting of the read clocks (FIG. 15B), and the count output passes through AND gate 903 to be converted to shading boundary detection signal (FIG. 15C).

An internal boundary detection signal (FIG. 15D) is generated in counter 902. The internal boundary detection signal becomes low level before the end of counting in counter 902 and becomes high level in response to the generation of image effective range signal VDEN (A3) (FIG. 15E). The leading edge of the shading boundary detection signal (FIG. 15C) is determined by the level down of comparison result signal e901, and the trailing edge thereof is determined by the level down of the internal boundary detection signal (FIG. 15D). A certain length of boundary line 23 is preliminary counted so as to avoid faulty operation due to noises. When boundary line 23 is actually detected, the internal boundary detection signal (FIG. 15D) becomes active low. Then, another counter (not shown) starts. When the count of the another counter reaches the start position of the image region of table 11, image effective range signal VDEN (FIG. 15E) is generated therefrom.

When no boundary line 23 is present, the abovementioned adjustment (synchronization of VSADE in one line) cannot be performed at the home position of optical carriage 15. For example, a chart original having a pattern or density different from that of shading correction plate 22 for subscanning is placed on original table 11, and is read by scanning of optical carriage 15. As a result, complex adjustment is required. In contrast to this, when the arrangement shown in FIG. 14 is employed, shading correction can be facilitated.

The operation of the above embodiment will be described below.

FIG. 16 is a diagram showing the relationship between movement of optical carriage 15 in image scanner 10, and an image forming operation of laser printer 30 upon comparison between the apparatus of the present invention (solid line) and an apparatus which is not an invention of the present application (alternate long and short dashed line). FIG. 16 exemplifies a continuous page copying operation in which images on the first and second pages of original or manuscript Or are formed on different paper sheets. An upper portion of FIG. 16 shows the movement of optical carriage 15, and its lower portion shows movements of front and rear ends of paper sheets in laser printer 30. Note that $a_1$ and $b_1$ in FIG. 16 designate movements of the front end of the first sheet; $a_{11}$ and $b_{11}$, movements of the rear end of the first sheet; $a_2$ and $b_2$, movements of the front end of the second sheet; and $a_{21}$ and $b_{21}$, movements of the rear end of the second sheet.

More specifically, when optical carriage 15 is moved to read an image on the first page of original Or, the first sheet (a sheet defined by front end $a_1$ and rear end $a_{11}$ or a sheet defined by front end $b_1$ and rear end $b_{11}$) is conveyed in laser printer 30.

Similarly, when optical carriage 15 is moved to read an image on the second page of original Or, the second sheet (a sheet defined by front end $a_2$ and rear end $a_{21}$ or a sheet defined by front end $b_2$ and rear end $b_{21}$) is conveyed in laser printer 30.

In this case, in the apparatus which is not the invention of the present application, since the white shading value for main scanning is rewritten for every read scanning by optical carriage 15, optical carriage 15 is returned to its home position upon completion of reading of the image on the first page, and is then moved to read the image on the second page.

In the apparatus of the present invention, after optical carriage 15 reads the image on the first page, it is slightly moved backward to be synchronized with laser printer 30, and can successively read the image on the second page. In the apparatus of the present invention, since the white shading value for main scanning need not be rewritten for every read scanning of original Or, optical carriage 15 need not be returned to its home position. Thus, an image forming operation of the second sheet, i.e., the sheet defined by front end $a_2$ and rear end $a_{21}$ can be performed at higher speed than that of the sheet defined by front end $b_2$ and rear end $b_{21}$ by a time required to move optical carriage 15 from a boundary of a page to the home position and to cause optical carriage 15 to return to the boundary of the page.

In this manner, when the white shading value for main scanning need not be rewritten for every read scanning of original Or, an operation for rewriting data can be omitted, for example, when optical carriage 15 reaches a boundary between the first and second pages in a continuous page copying mode. Therefore, an image forming speed can be increased.

Figure 17A:
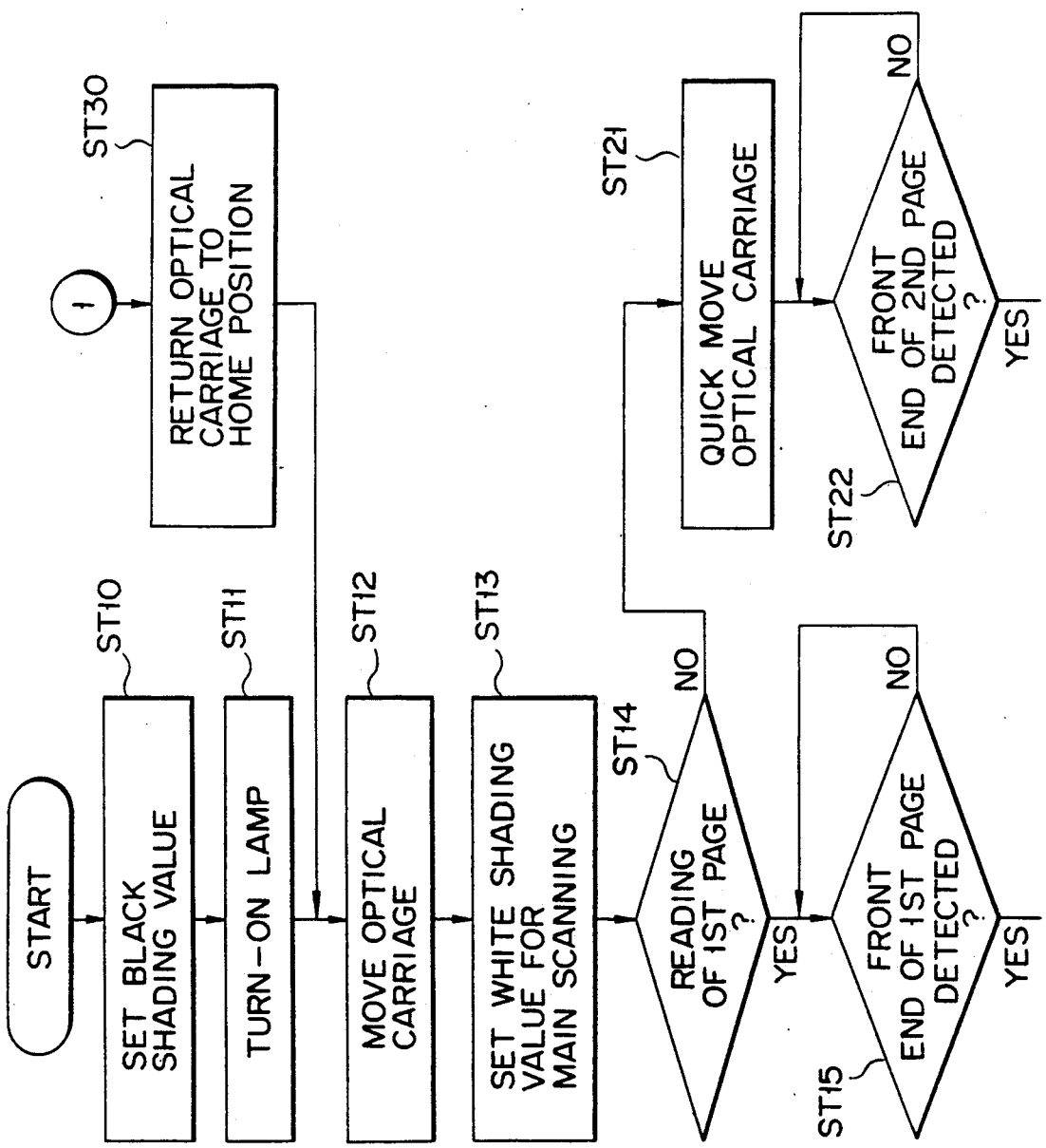
FIGS. 17A and 17B form a flow chart for explaining control, e.g., a page continuous printing operation of the optical carriage.
Figure 17B:
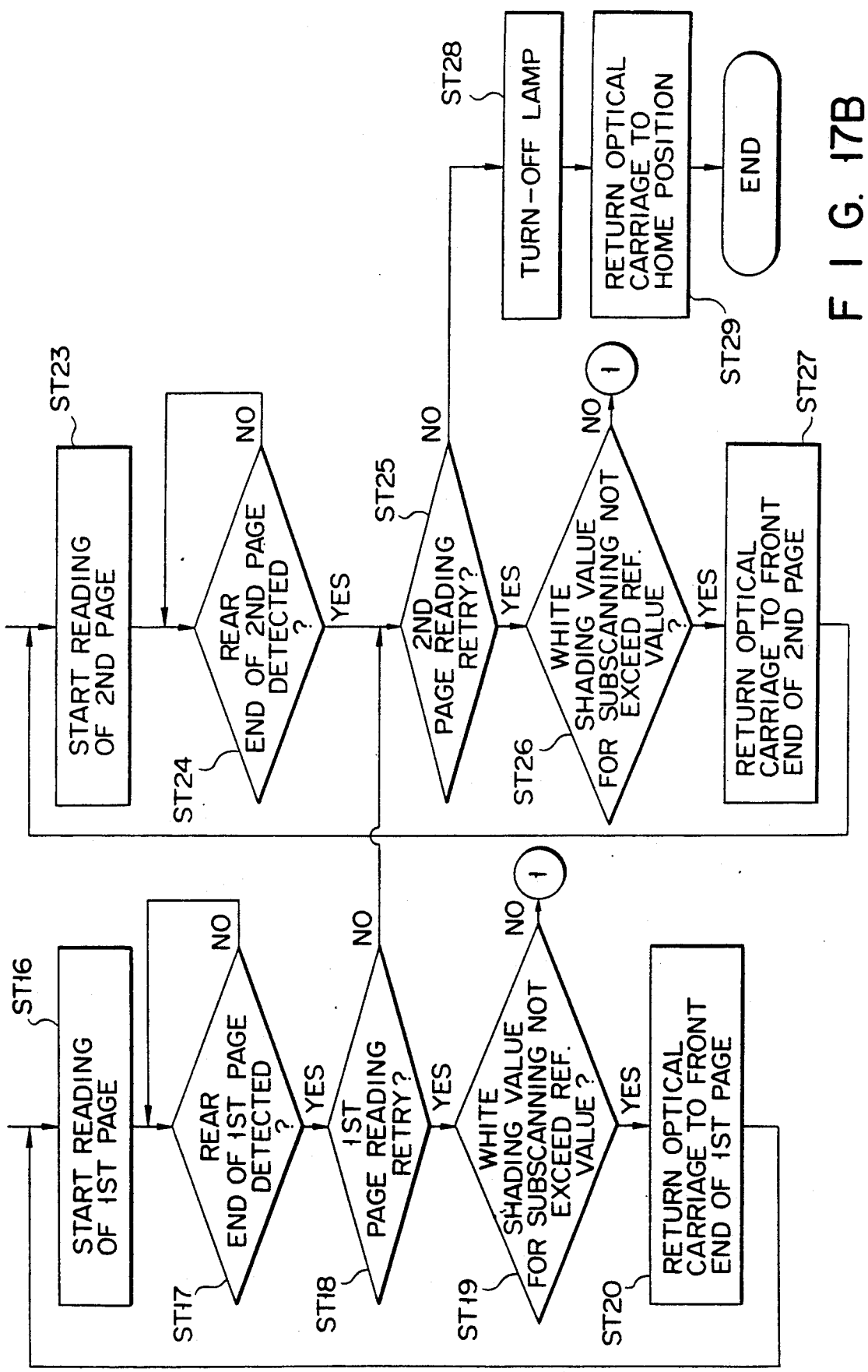

FIG. 17 is a flow chart showing a control example of optical carriage 15 in the above-mentioned continuous page copying mode. A page closer to shading correction plate 21 for main scanning is assumed to be the first page of original Or, and a farther page is assumed to be the second page. In an initial state, optical carriage 15 is assumed to be located at the home position.

When a start key (not shown) on manipulation panel 68 is depressed, reading of shading correction plate 21 is performed while illumination lamp 13 of optical carriage 15 in image scanner 10 is kept off, and a black shading value is set in black shading memory $660f$ (ST10).

Subsequently, illumination lamp 13 of optical carriage 15 is turned on (ST11), and movement of optical carriage 15 is started (ST12). Upon movement of optical carriage 15, shading correction plate 21 for main scanning is read, and a white shading value for main scanning is set in white shading memory $660h$ for main scanning (ST13).

In this state, read scanning of original Or is started. More specifically, in order to read an image on the first page closer to shading correction plate 21 for main scanning (YES in step ST14), optical carriage 15 is moved to the front end of the first page (YES in step ST15). In position control of optical carriage 15, when driving motor 150 employs a pulse motor, pulse counts according to the positions of carriage 15 need only be prestored in RAM 63. When driving motor 150 employs another type of motor, e.g., a DC motor, various methods, i.e., a method of detecting the position of the carriage using a position sensor, a method of counting a pulse count by a pulse generator, and the like, may be employed.

An image on the first page is read while performing position control of optical carriage 15 (ST16).

When the image on the first page is successively read (YES in step ST18) after optical carriage 15 is moved to the rear end of the first page (YES in step ST17), it is checked if a white shading value for subscanning in the last line does not exceed a reference value. If the white shading value for subscanning does not exceed the reference value (YES in step ST19), optical carriage 15 is moved to the front end of the first page (ST20), and reading of the first page is performed again (ST16). However, if the white shading value for subscanning in the last line exceeds the reference value (NO in step ST19), optical carriage 15 is returned to the home position to compensate for a change in light amount of the fluorescent lamp (ST30). Shading correction plate 21 for main scanning is read again to rewrite the white shading value for main scanning.

When the image on the second page is to be read (NO in step ST14), if the white shading value for subscanning in the last line does not exceed the reference value (YES in step ST26), optical carriage 15 is slightly returned (ST27), and thereafter, reading of the second page is started (ST23). If the white shading value for subscanning exceeds the reference value (NO in step ST26), optical carriage 15 is returned to the home position (ST30), and the white shading value for main scanning is similarly rewritten. Optical carriage 15 is then moved to the front end of the second page at a speed higher than a scanning speed during normal read scanning (ST21). If the front end of the second page is detected (YES in step ST22), reading of the second page is performed at a predetermined scanning speed (ST23).

When reading of the second page is completed (YES in step ST24; NO in step ST25), illumination lamp 13 is turned off (ST28), and optical carriage 15 is returned to the home position (ST29), thus completing processing.

In this manner, when the white shading value for subscanning does not exceed the reference value, rewriting of the white shading value for main scanning is omitted, thus increasing an image forming speed.

Upon reading of the second page, even when the white shading value for subscanning in the last line does not exceed the reference value, optical carriage 15 must be slightly returned in consideration of overrun of driving motor 150. For example, when the start key is successively turned on, i.e., when a plurality of originals Or are to be continuously copied, after the white shading value for main scanning is set upon the first key operation, it is rewritten according to the white shading value for subscanning in the last line.

Figure 18:
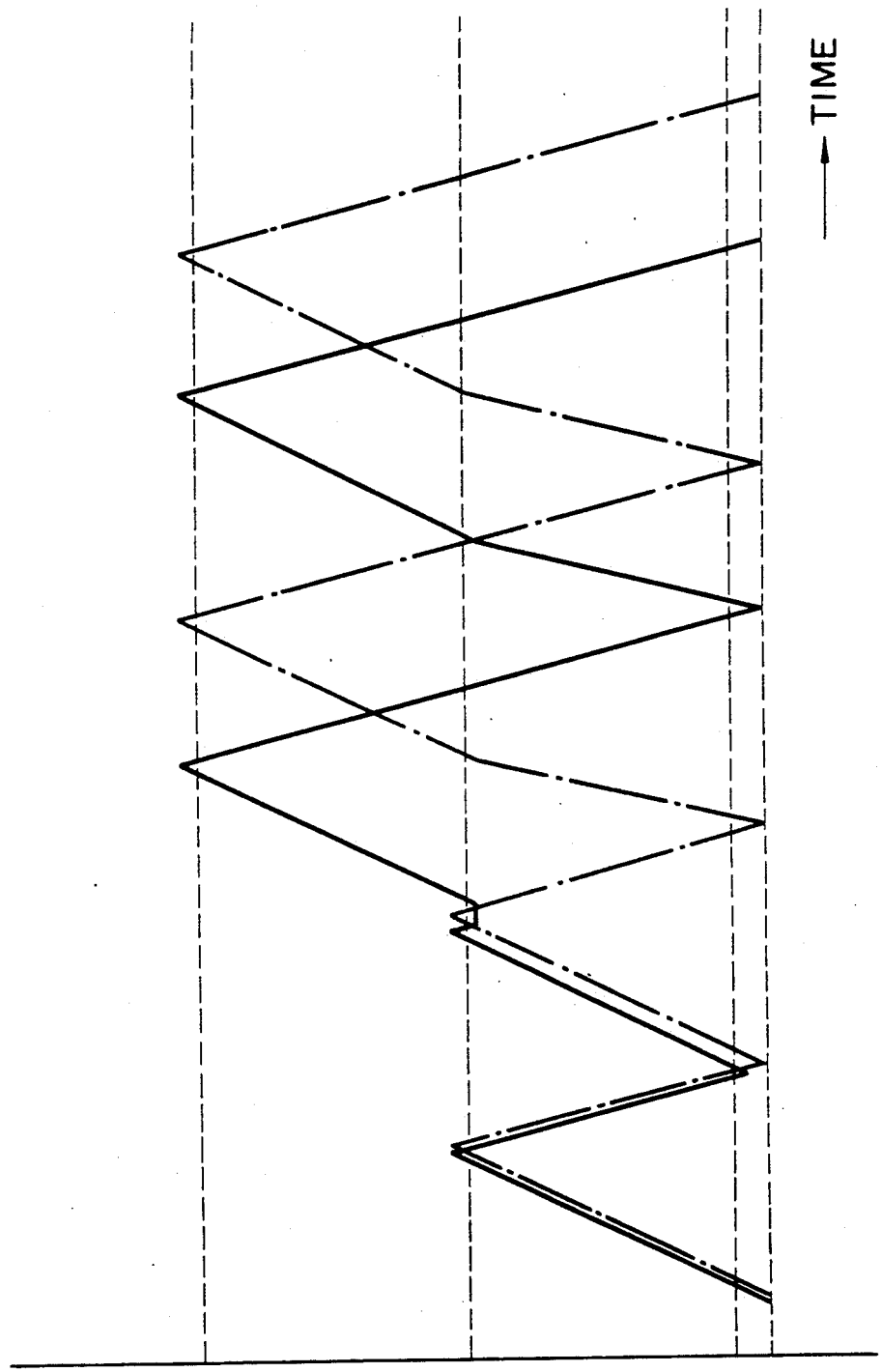
FIG. 18 is a diagram for explaining movement, e.g., the time limit operation of the optical carriage.
Figure 19A:
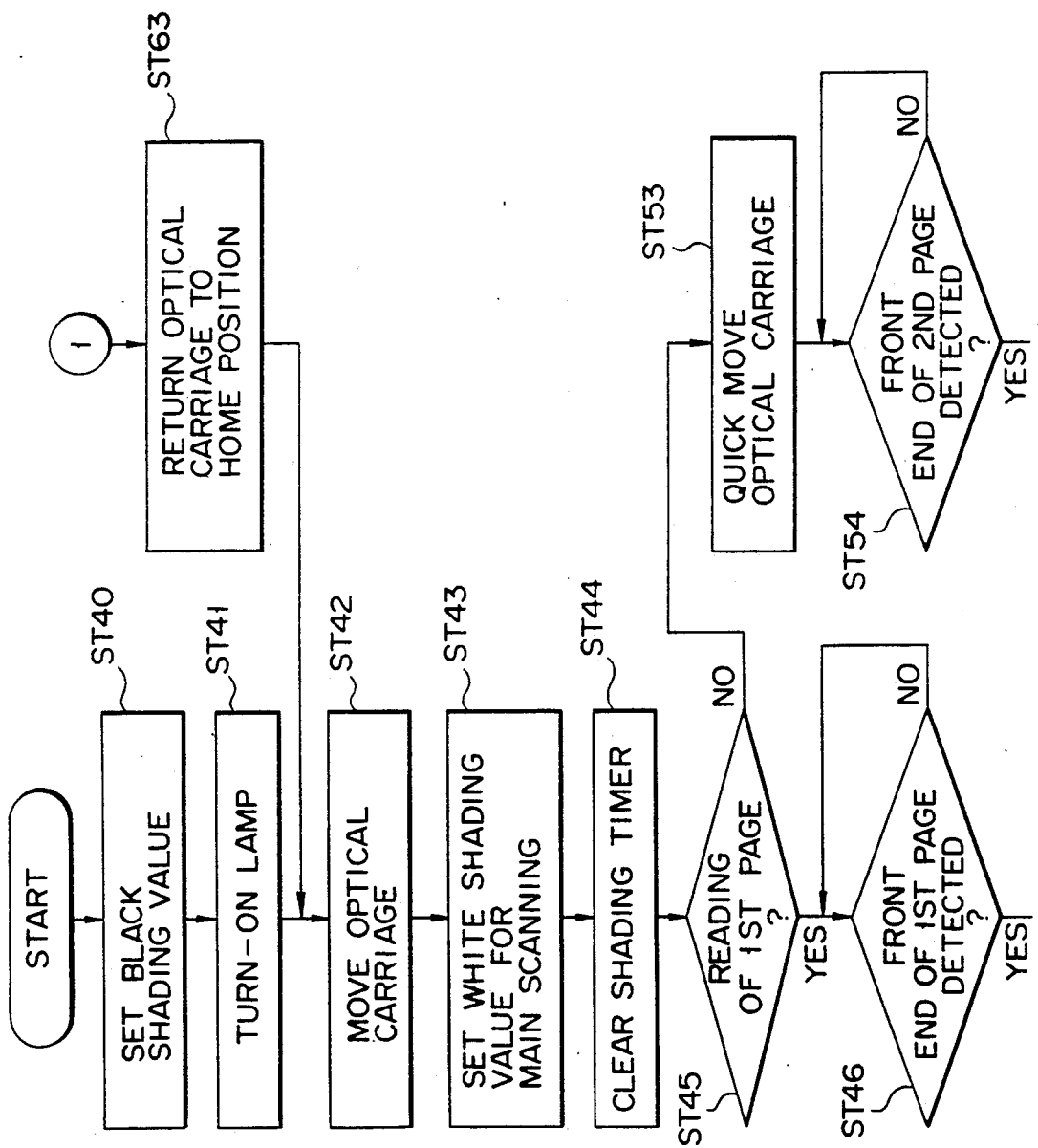
FIGS. 19A and 19B form a flow chart for explaining control, e.g., the time limit operation of the optical carriage.
Figure 19B:
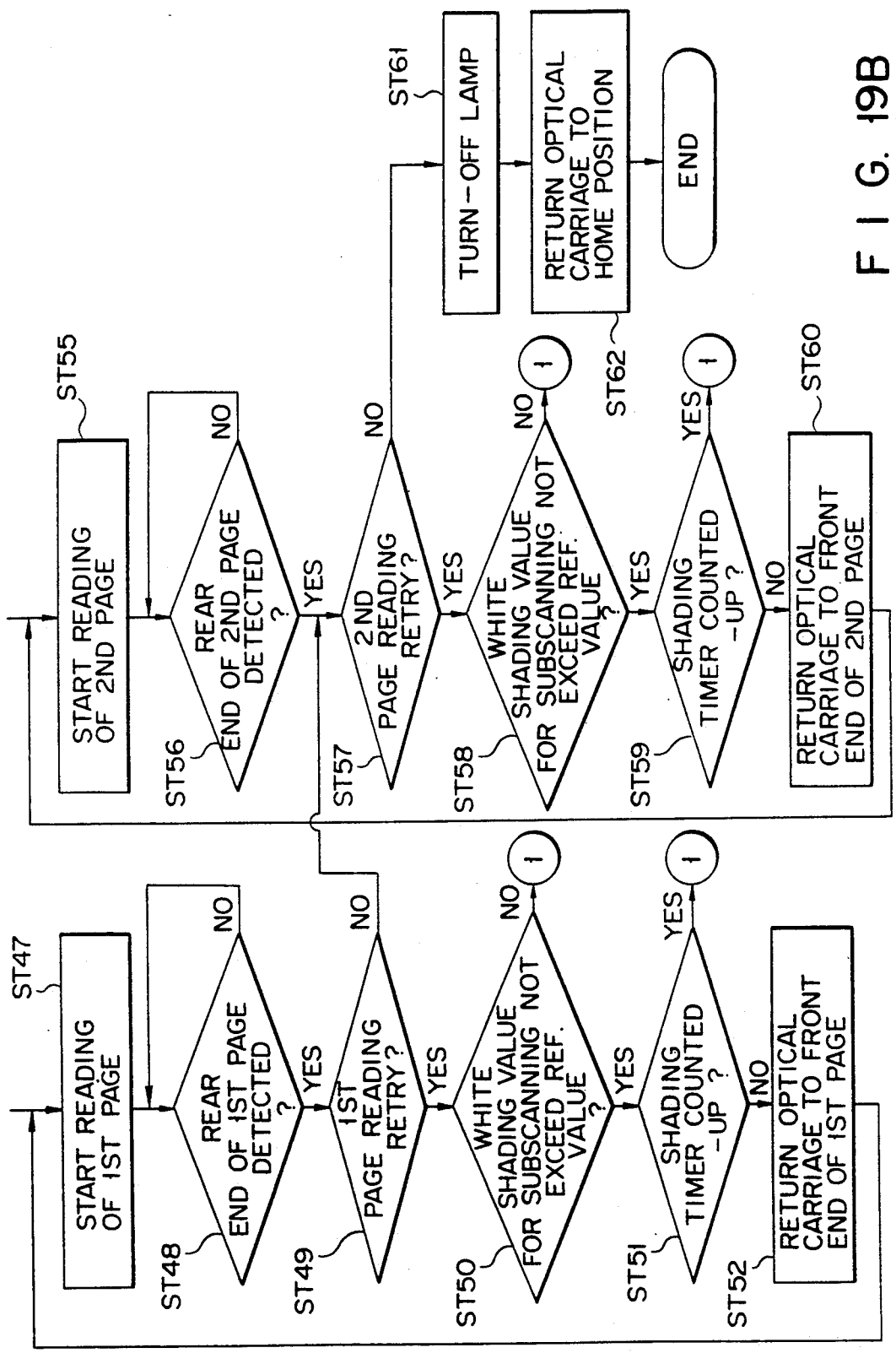

FIGS. 18 and 19 are respectively a diagram and a flow chart for explaining the movement of optical carriage 15 by a time limit operation.

In FIG. 18, a solid line represents the operation of the apparatus of the present invention, and an alternate long and short dashed line represents an operation of an apparatus which is not the invention of the present application. In this case, it is assumed that a shading correction timer (not shown) counts up during an image forming operation of the third page. (In practice, the timer is set to be about 30 sec so as not to count up too early. This timer setting is provided for changes with time in the light distribution characteristic of the lamp).

FIG. 20 shows a modification of FIG. 3. In the embodiment shown in FIG. 20, a pair of white reference shading correction plates 22A and 22B are arranged at two sides of original table 11 in the main scanning direction.

Assuming that an xth main scanning operation is performed, portion 22Ax of left white reference shading correction plate 22A is read first upon scanning of optical carriage 15. White reference data of portion 22Ax is stored in white shading memory 660l for subscanning shown in FIG. 8 by this reading. Shading correction of image data of xth main scanning operation 21x performed immediately after reading of correction plate 22A is performed on the basis of this white reference data.

Shading correction may be performed by a method other than those described above.

For example, portions 22Ax and 22Bx of white reference shading correction plates 22A and 22B are read in xth main scanning operation 21x, and their average data (=[22Ax +22Bx]/2) is stored in white shading memory 660l for subscanning. Shading correction of image data in (x+1)th main scanning operation 21x+1 performed immediately thereafter may be executed on the basis of average white reference data stored in memory 660l.

Alternatively, portion 22Bx of white reference shading correction plate 22B is read in xth main scanning operation 21x, and portion 22Ax+1 of white reference shading correction plate 22A is subsequently read in (x+1)th main scanning operation 21x+1. Their average data (=[22Bx +22Ax+1]/2) is stored in white shading memory 660l for subscanning. Shading correction of image data in (x+1)th main scanning operation 21x+1 performed immediately thereafter (or image data in (x+2)th main scanning operation 21x+2) may be executed on the basis of average white reference data stored in memory 660l.

As described above, image data during one scanning period obtained by controlling the temperature of the fluorescent lamp to be constant can be obtained without using a heater and a temperature control circuit and without rewriting a white shading value for main scanning for every scanning.

More specifically, a signal subjected to main scan shading correction is divided by a shading value for subscanning, thereby assuring reliability of image data during one scanning period. Thus, neither a heater nor a temperature control circuit are required, and an unnecessary rewriting operation of a white shading value for main scanning can be omitted. Therefore, cost can be reduced by that required for the heater and the temperature control circuit, and an operation time which does not contribute to an image forming operation can be shortened.

In this embodiment, the shading correction plate for subscanning is arranged at a position corresponding to the beginning of reading of the image sensor in the main scanning direction. For this reason, when an output from the image sensor is to be processed, reference data can be obtained prior to an object to be processed. Therefore, an output as an object to be processed need not be stored in any format, and can be processed in real time on the basis of the reference data. Thus, a circuit and a processing time can be minimized.

Since the shading correction plate for subscanning and an original are scanned by one image sensor, a circuit arrangement can be simplified, and the same temperature characteristics can be obtained due to a monolithic structure. Therefore, temperature compensation need not be performed. In addition, since elements have almost the same sensitivity characteristics, a compensation circuit can be omitted.

In the above embodiment, the illumination lamp as an original illumination device comprises a fluorescent lamp. However, the present invention is not limited to this. For example, the present invention may be applied to an original illumination device employing a cold-cathode tube.

Various other changes and modifications may be made within the spirit and scope of the invention.

As described above, according to the present invention, there can be provided an inexpensive image reading apparatus which can assure reliability of image data during one scanning period by a simple arrangement, and can realize a high-speed image forming operation without keeping constant a temperature of a fluorescent lamp or rewriting shading correction data for main scanning for every scanning.

Note that all the disclosure of the following related U.S. patent application is incorporated in the specification of the present application:

U.S. Ser. No. 465,362 filed on Jan. 16, 1990

AN IMAGE READING APPARATUS WITH IMPROVED IMAGE FORMING SPEED

Inventors:
Takefumi NOSAKI
Kazuo SASAMA

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. An apparatus for reading image information from an original by scanning both along a main scanning axis and a subscanning axis perpendicular too the main scanning axis, comprising:
   a first reference portion of a predetermined shade of darkness, arranged along the main scanning axis;
   a second reference portion of a predetermined shade of darkness, arranged along the subscanning axis;
   means for scanning said first and second reference portions and image information on an original, to provide image data; and means for correcting the shading of the image data provided by said scanning means, in accordance with data obtained both from said first and second reference portions, so that a resultant corrected image data has a desired shade of darkness.

2. An apparatus according to claim 1, further comprising:
   a reference plate, arranged along the main scanning axis, of a predetermined shade of darkness; and
   main scan shading correction means for correcting the image data scanned by said scanning means following scanning of the reference plate on the basis of data read from the reference plate.

3. An apparatus according to claim 2, further comprising:
   means for detecting a boundary between said reference plate and said reference portion, data of the boundary determining a timing for performing shading correction of the image data of the original following the reference portion.

4. An apparatus according to claim 2, wherein each predetermined shade of darkness of said reference plate and said reference portion has a reference, and
   said apparatus further comprises:
   black shading correction means for performing black shading correction of the image data of the original.

5. An apparatus according to claim 1, wherein said reference portion has first and second white reference portions arranged at two sides of the original along the subscanning axis, and
   said correcting means includes means for correcting the image data scanned by said scanning means following scanning of the first white reference portion on the basis of data read from the first white reference portion.

6. An apparatus according to claim 1, wherein said reference portion has first and second white reference portions arranged at two sides of the original along the subscanning axis, and
   said correcting means includes means for performing a shading correction of the image data of the original by scanning following scanning of the second white reference portion on the basis of second white reference portion image data obtained when said scanning means scans the second white reference portion.

7. An apparatus according to claim 1, wherein said reference portion has first and second white reference portions arranged at two sides of the original along the subscanning axis, and
   said correcting means includes means for performing shading correction of the image data of the original by scanning following scanning of the second white reference portion on the basis of an average of first white reference portion image data obtained when said scanning means scans the first white reference portion, and second white reference portion image data obtained when said scanning means scans the second white reference portion.

8. An apparatus according to claim 1, wherein said reference portion has first and second white reference portions at two sides of the original along the subscanning axis, and
   said correcting means includes means for performing shading correction of the image data of the original by scanning following scanning of the first white reference portion on the basis of an average of second white reference portion image data obtained when said scanning means scans the second white reference portion, and first white reference portion image data obtained when said scanning means scans the first white reference portion after scanning of the second white reference portion.

9. An apparatus according to claim 1, further comprising:
   means for rewriting image data of the reference portion every time said scanning means scans the original.

10. An apparatus according to claim 2, further comprising:
    first means for rewriting image data of the reference portion every time said scanning means scans the original; and
    second means for rewriting image data of the reference plate at a lower frequency than a rewriting operation by said first means.

11. An image reading apparatus including a reading unit for reading image information upon movement, and an image forming unit for forming an image according to the image information from said reading unit, comprising:
    a first reference plate arranged along a direction perpendicular to a moving direction of said reading unit; and
    a second reference plate arranged along the moving direction of said reading unit.

12. An image reading apparatus including a reading unit for reading image information upon movement and g to the image information from said reading unit, comprising:
    a first white reference plate arranged along a direction perpendicular to a moving direction of said reading unit;
    a second white reference plate arranged along the moving direction of said reading unit; and
    means for reading said first and second white reference plate in each scanning line during read scanning of the image information.

13. An apparatus for reading image information from an original by scanning both along a main scanning axis and a subscanning axis perpendicular to the main scanning axis, comprising:
    means for generating light to be radiated onto the original;
    a reference plate of a predetermined shade of darkness, arranged along the subscanning axis;
    means for scanning light from said generating means along the subscanning axis, so as to read shading data corresponding to the reference plate and image information from the original to provide image data;
    means for returning the light to the reference plate along the subscanning axis, so as to compensate for a change in the amount of the light from said generating means when a value of the shading data at a prescribed position with respect to the subscanning axis exceeds a predetermined value; and means for correcting the shading of the image data by said scanning means in accordance with the shading data obtained from the reference plate, so that a resultant corrected image data has a desired shade of darkness.

14. A scanner according to claim 13, further comprising:

a reference plate of a predetermined shade of darkness, arranged at the home position along said main scanning axis.

* * * * *